United States Patent
Judge et al.

(10) Patent No.: US 11,323,003 B2
(45) Date of Patent: May 3, 2022

(54) COMPACT, MODULAR, PUMP OR TURBINE WITH INTEGRAL MODULAR MOTOR OR GENERATOR AND COAXIAL FLUID FLOW

(71) Applicant: Flowserve Management Company, Irving, TX (US)

(72) Inventors: Scott C. Judge, Bethlehem, PA (US); Andreas Dreiss, Hamburg (DE); Neil Havrilla, Hazle Township, PA (US); David Olexson, Jr., Bethlehem, PA (US)

(73) Assignee: Flowserve Management Company, Irving, TX (US)

(*) Notice: Subject to any disclaimer, the term of this patent is extended or adjusted under 35 U.S.C. 154(b) by 32 days.

(21) Appl. No.: 16/668,665

(22) Filed: Oct. 30, 2019

(65) Prior Publication Data

US 2020/0067376 A1 Feb. 27, 2020

Related U.S. Application Data

(63) Continuation-in-part of application No. 16/204,997, filed on Nov. 29, 2018, which is a
(Continued)

(51) Int. Cl.
*F04D 1/06* (2006.01)
*H02K 5/20* (2006.01)
(Continued)

(52) U.S. Cl.
CPC ............. *H02K 5/20* (2013.01); *F04D 1/066* (2013.01); *F04D 1/08* (2013.01); *F04D 13/0666* (2013.01);
(Continued)

(58) Field of Classification Search
CPC ............. F04D 29/5806; F04D 25/0653; F04D 29/447; F04D 3/00–02; F04D 13/0666;
(Continued)

(56) References Cited

U.S. PATENT DOCUMENTS 1,632,357 A * 6/1927 White .................. F04D 1/06
417/354
1,949,796 A * 3/1934 Himmel .............. F04D 13/0673
417/421
(Continued)

FOREIGN PATENT DOCUMENTS

EP 2626573 A1 8/2013

OTHER PUBLICATIONS

Office Action for U.S. Appl. No. 16/204,997 dated Jul. 2, 2020, 6 Pages.
(Continued)

*Primary Examiner* — Devon C Kramer
*Assistant Examiner* — Thomas Fink
(74) *Attorney, Agent, or Firm* — Maine Cernota & Rardin

(57) ABSTRACT

A coaxial pump or turbine module includes an integral, modular motor or generator comprising a magnet structure containing radial or axial permanent magnets and/or induction coils detachably fixed to a rotor, and a stator housing detachably fixed to the module housing. Working fluid is directed axially through a flow path symmetrically distributed within an annulus formed between the module housing and the stator housing. The stator housing can be cooled by the working fluid, or by a cooling fluid flowing between passages of the flow path. The flow path can extend over substantially a full length and rear surface of the stator housing. A plurality of the modules can be combined into a multi-stage apparatus, with rotor speeds independently controlled by corresponding variable frequency drives. Embodi-
(Continued)

ments include guide vanes and/or diffusers. The rotor can be fixed to a rotating shaft, or rotate about a fixed shaft.

22 Claims, 26 Drawing Sheets

Related U.S. Application Data continuation-in-part of application No. 15/793,457, filed on Oct. 25, 2017, now abandoned.

(51) Int. Cl.
*H02K 5/167* (2006.01)
*H02K 5/22* (2006.01)
*H02K 9/193* (2006.01)
*H02K 7/08* (2006.01)
*F04D 13/14* (2006.01)
*F04D 1/08* (2006.01)
*F04D 13/06* (2006.01)

(52) U.S. Cl.
CPC ........... *F04D 13/14* (2013.01); *H02K 5/1677* (2013.01); *H02K 5/225* (2013.01); *H02K 7/088* (2013.01); *H02K 9/193* (2013.01); *H02K 2205/03* (2013.01); *H02K 2213/12* (2013.01)

(58) Field of Classification Search
CPC .... F04D 19/00–048; F04D 1/066; F04D 1/08; F04D 13/14
See application file for complete search history.

(56) References Cited

U.S. PATENT DOCUMENTS

| | | | |
|---|---|---|---|
| 2,438,629 A | 3/1948 | Anderson | |
| 2,440,947 A * | 5/1948 | Hart | F04D 29/167 |
| | | | 415/172.1 |
| 2,752,857 A | 7/1956 | White | |
| 2,824,520 A * | 2/1958 | Bartels | F04D 15/0033 |
| | | | 417/423.7 |
| 2,855,141 A * | 10/1958 | Van Rijn | F04D 25/0693 |
| | | | 417/423.14 |
| 2,968,249 A * | 1/1961 | Caine | F04D 3/00 |
| | | | 417/369 |
| 3,102,679 A * | 9/1963 | Rudy | F04D 17/165 |
| | | | 417/84 |
| 3,135,212 A * | 6/1964 | Todd | F04D 13/08 |
| | | | 417/423.1 |
| 3,364,866 A | 1/1968 | Sato | |
| 3,868,196 A * | 2/1975 | Lown | F04D 29/442 |
| | | | 415/146 |
| 4,213,745 A * | 7/1980 | Roberts | F04D 13/0653 |
| | | | 237/63 |
| 4,508,998 A | 4/1985 | Hahn | |
| 4,806,080 A | 2/1989 | Mizobuchi et al. | |
| 5,117,141 A | 5/1992 | Hawsey et al. | |
| 5,158,440 A | 10/1992 | Cooper et al. | |
| 5,269,664 A | 12/1993 | Buse | |
| 5,332,374 A | 7/1994 | Kricker | |
| 5,494,418 A * | 2/1996 | Moriya | F04D 29/167 |
| | | | 417/423.14 |
| 5,567,133 A * | 10/1996 | Kobaybashi | F04D 13/14 |
| | | | 417/423.7 |
| 5,713,727 A | 2/1998 | Veronesi et al. | |
| 6,012,909 A * | 1/2000 | Sloteman | F04D 13/0666 |
| | | | 415/58.2 |
| 6,034,465 A * | 3/2000 | McKee | F04D 13/0666 |
| | | | 310/156.23 |
| 6,056,518 A * | 5/2000 | Allen | F04D 13/06 |
| | | | 415/219.1 |
| 6,135,098 A * | 10/2000 | Allen | F04D 19/002 |
| | | | 123/565 |
| 6,175,173 B1 * | 1/2001 | Stephan | H02K 5/1285 |
| | | | 310/87 |
| 6,422,838 B1 * | 7/2002 | Sloteman | F04D 13/0666 |
| | | | 415/101 |
| 6,835,051 B2 | 12/2004 | Heim et al. | |
| 7,067,950 B2 | 6/2006 | Hirzel et al. | |
| 8,303,268 B2 | 11/2012 | Werson et al. | |
| 2002/0035974 A1 * | 3/2002 | Pawellek | F04D 3/005 |
| | | | 123/41.44 |
| 2002/0106290 A1 * | 8/2002 | Bader | F04D 13/06 |
| | | | 417/366 |
| 2003/0021683 A1 * | 1/2003 | Capone | F04D 29/047 |
| | | | 415/220 |
| 2004/0013547 A1 * | 1/2004 | Allen | F04D 3/00 |
| | | | 417/423.1 |
| 2005/0196269 A1 * | 9/2005 | Racer | F04D 29/605 |
| | | | 415/62 |
| 2007/0048158 A1 * | 3/2007 | Kochan, Jr. | F04D 13/0666 |
| | | | 417/423.3 |
| 2009/0208349 A1 * | 8/2009 | Eller | F04D 7/04 |
| | | | 417/244 |
| 2011/0164995 A1 * | 7/2011 | Genster | F04D 3/00 |
| | | | 417/363 |
| 2011/0238172 A1 * | 9/2011 | Akdis | A61M 1/101 |
| | | | 623/3.11 |
| 2011/0318175 A1 | 12/2011 | Converse | |
| 2013/0028760 A1 * | 1/2013 | Lin | F04D 13/14 |
| | | | 417/410.1 |
| 2013/0213325 A1 * | 8/2013 | Kim | F01P 5/10 |
| | | | 123/41.44 |
| 2013/0236341 A1 | 9/2013 | Andersen | |
| 2015/0104335 A1 | 4/2015 | Faller | |
| 2016/0006379 A1 * | 1/2016 | Wang | H02P 5/74 |
| | | | 318/5 |
| 2016/0072362 A1 * | 3/2016 | Kube | H02K 7/14 |
| | | | 310/67 R |
| 2016/0305447 A1 * | 10/2016 | Dreiss | H02K 16/005 |

OTHER PUBLICATIONS

PCT International Search Report & Written Opinion for Appl No. PCT/US2018/060690 dated Mar. 12, 2019, 17 pages.
International Search Report and Written Opinion for PCT Appl. No. PCT/US2020/056972, dated Feb. 17, 2021, 11 Pages.

\* cited by examiner

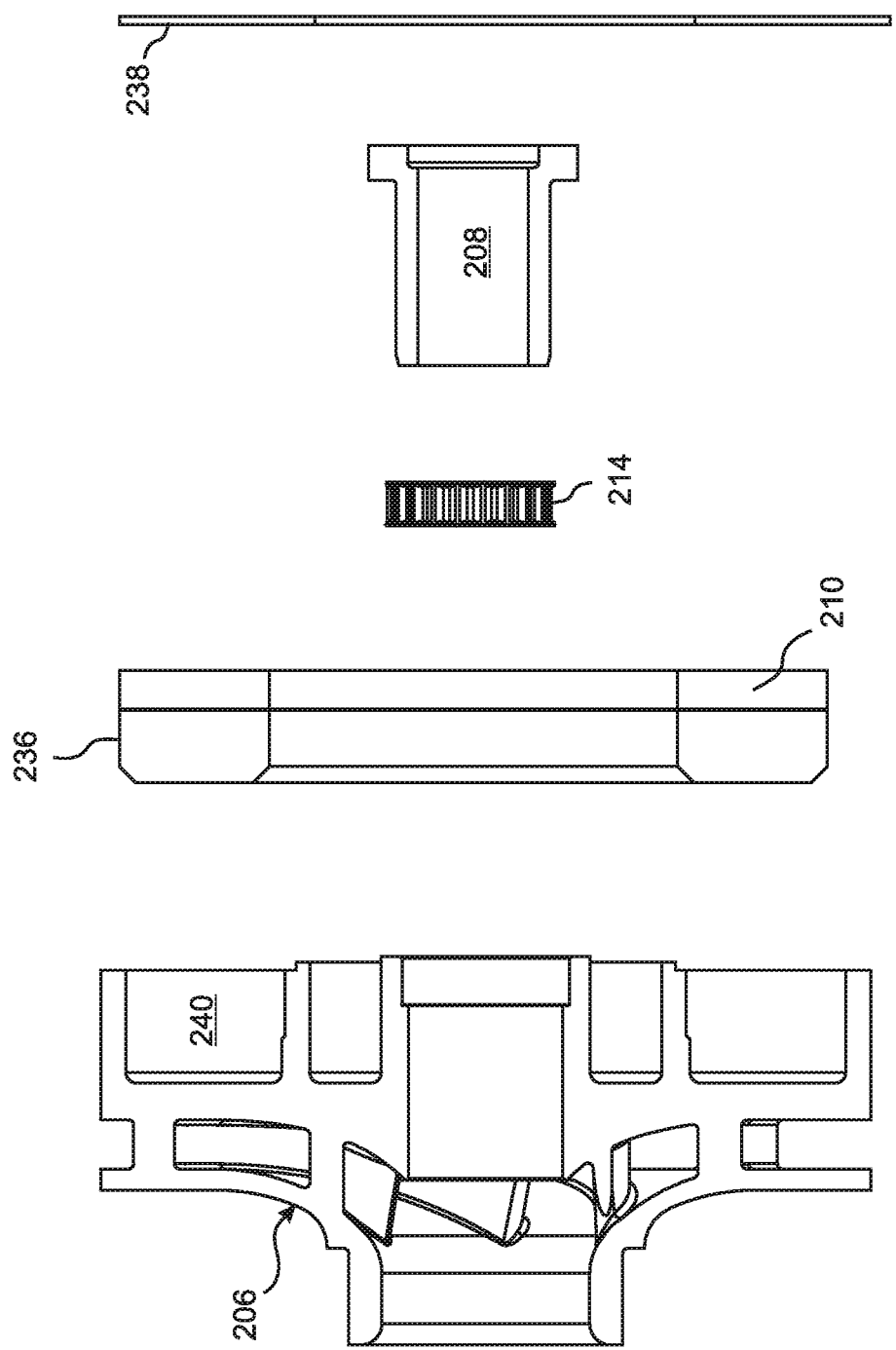

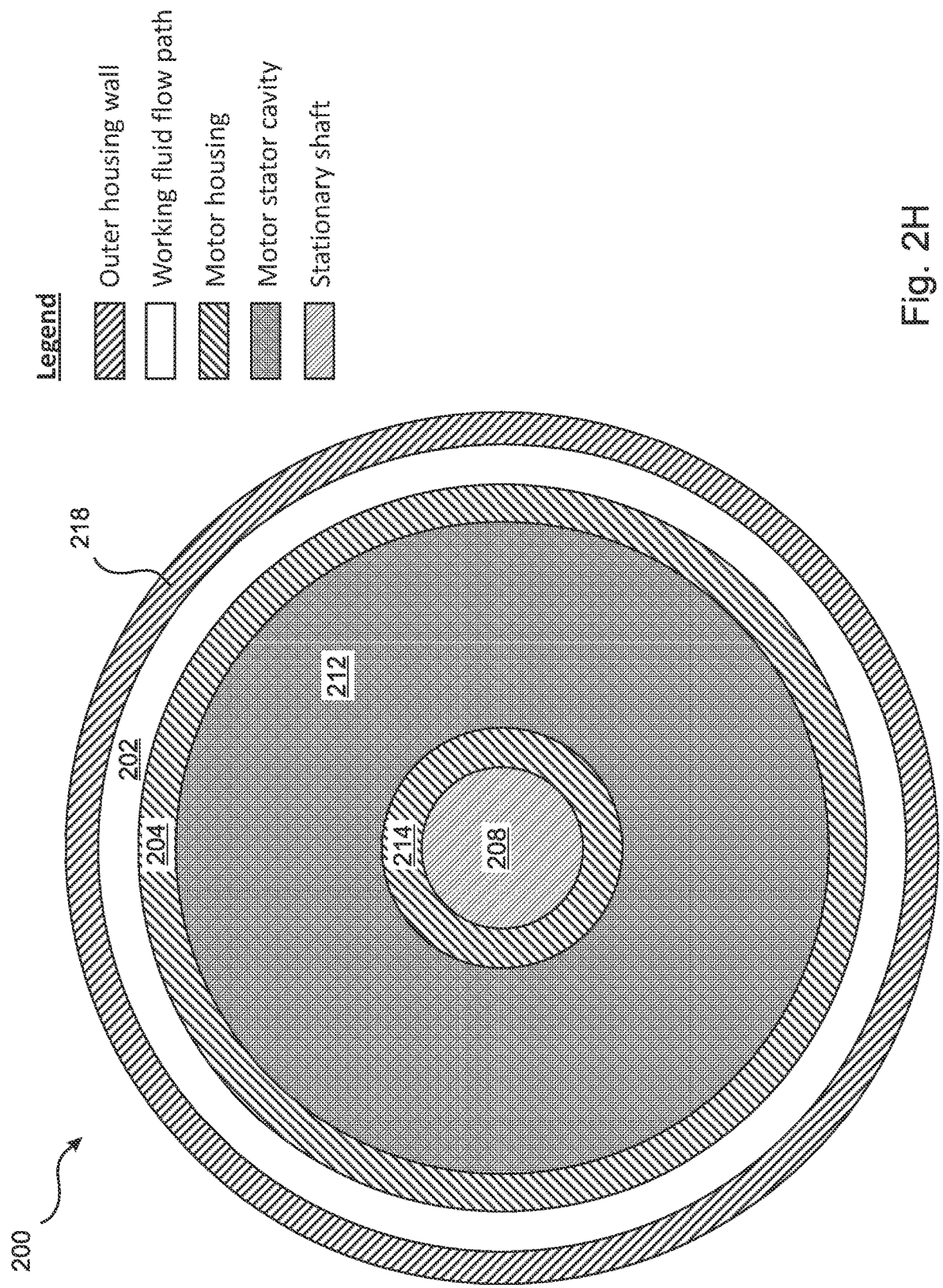

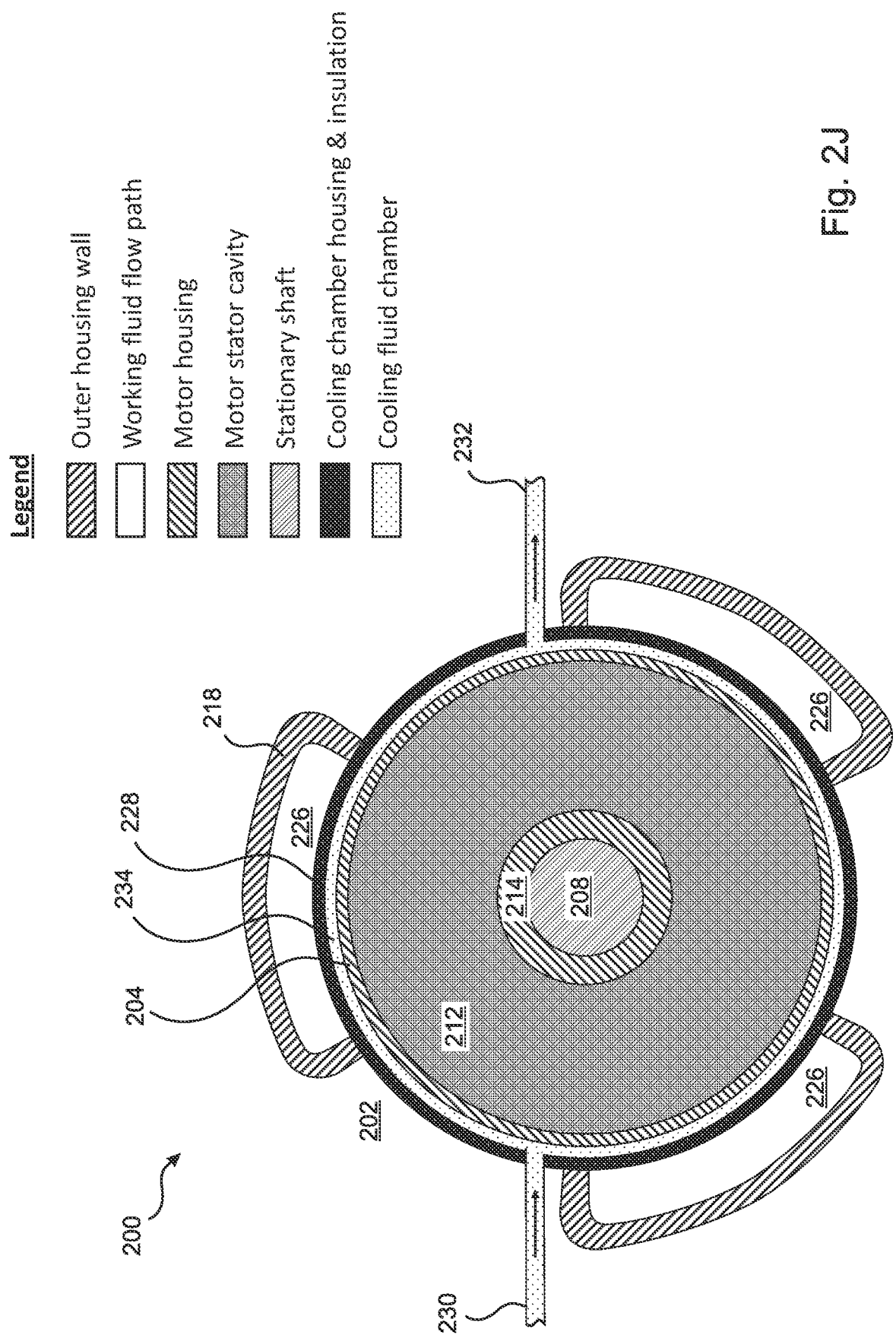

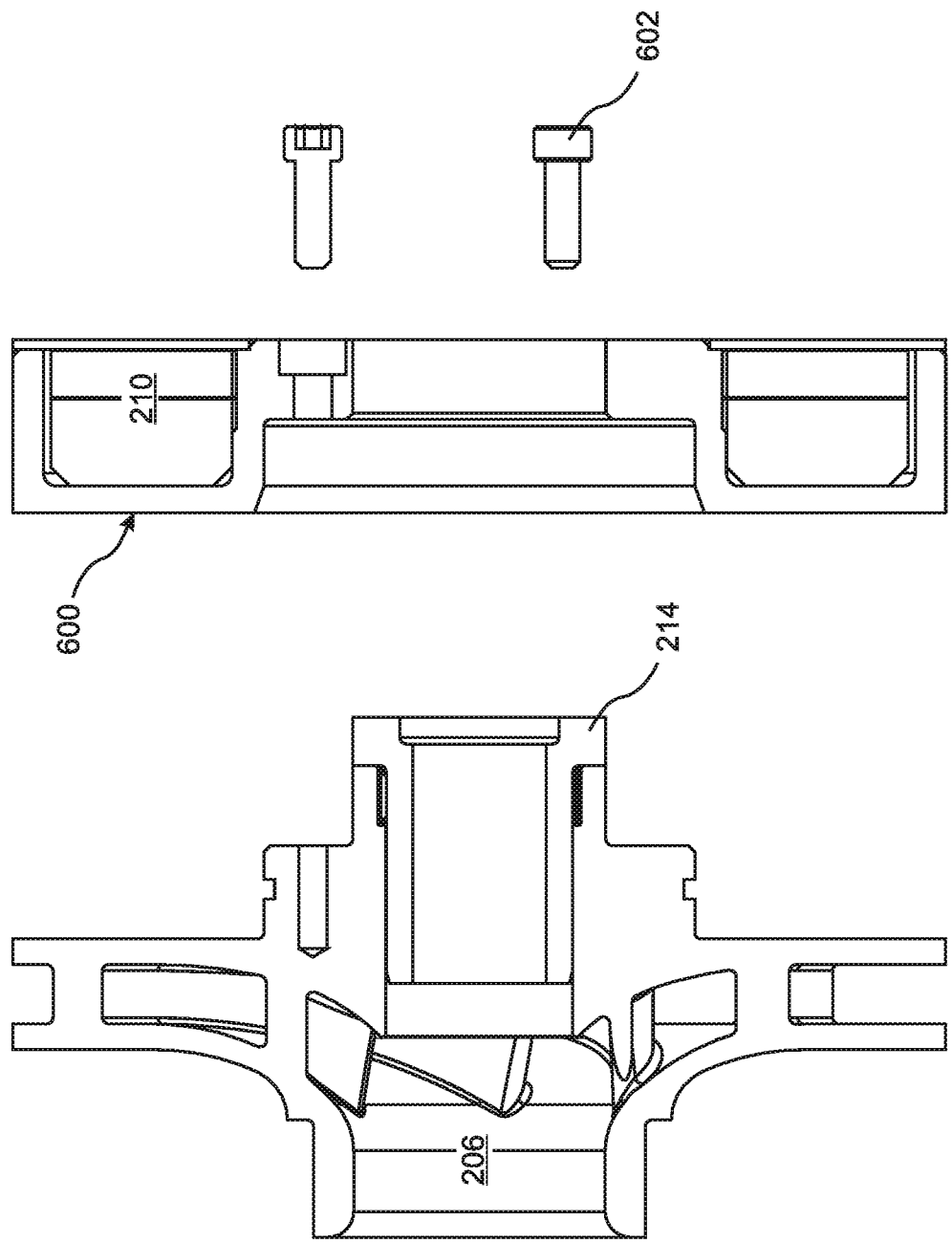

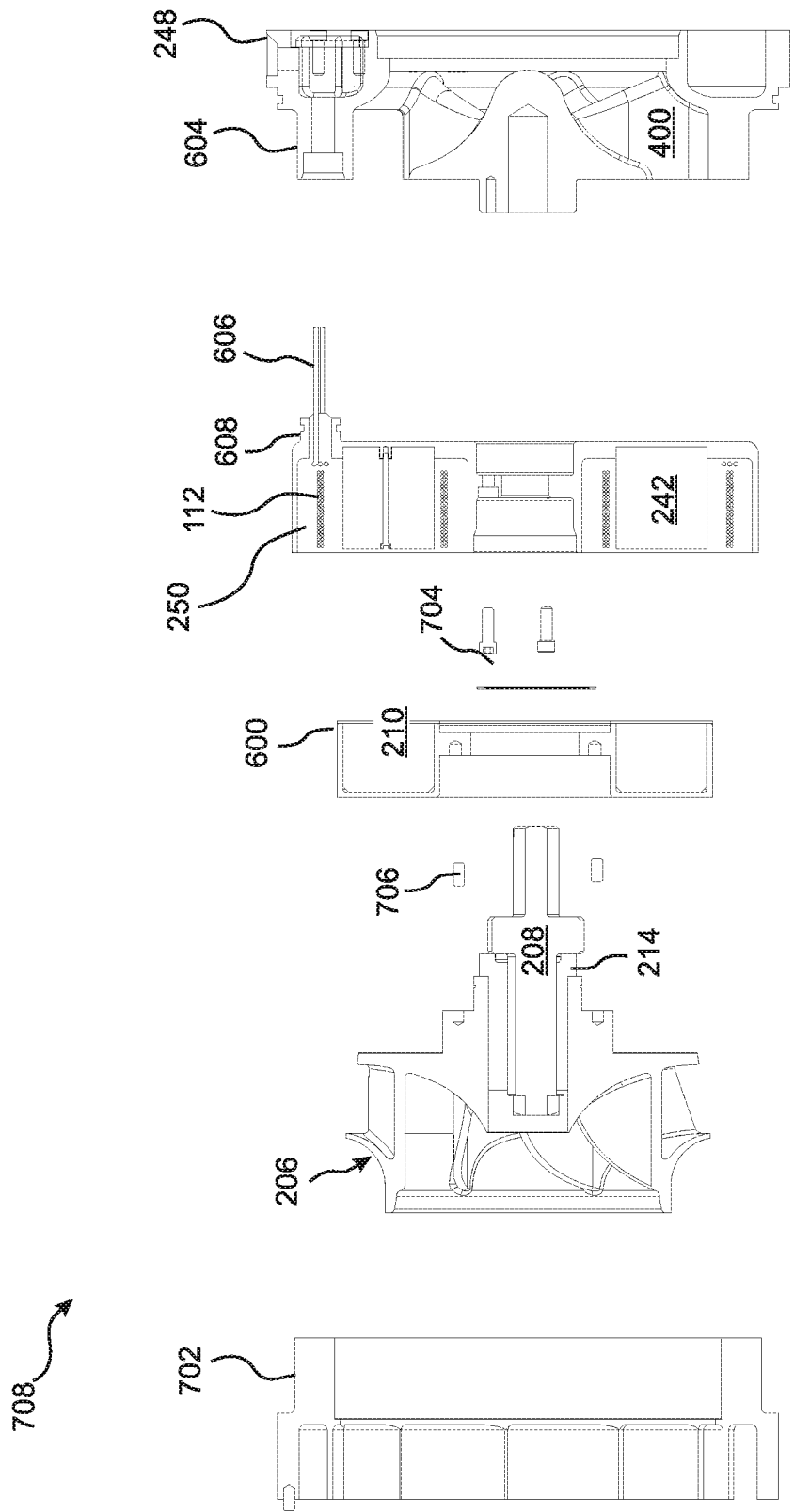

COMPACT, MODULAR, PUMP OR TURBINE WITH INTEGRAL MODULAR MOTOR OR GENERATOR AND COAXIAL FLUID FLOW

RELATED APPLICATIONS

This application is a continuation in part of U.S. application Ser. No. 16/204,997, filed Nov. 29, 2018. Application Ser. No. 16/205,997 is a continuation in part of U.S. application Ser. No. 15/793,457, filed Oct. 25, 2017. All of these applications are herein incorporated by reference in their entirety for all purposes.

FIELD OF THE INVENTION

The invention relates to pumps and turbines, and more particularly, to integral sealless pumps and turbines.

BACKGROUND OF THE INVENTION

Rotodynamic pumps and turbines are often highly similar in their physical designs, such that the difference between a pump and a turbine can sometimes be mainly a question of use rather than structure. Accordingly, features of the present invention and of the prior art that are discussed herein with reference to a turbine or to a pump should be understood to refer equally to both, except where the context requires otherwise.

In a conventional rotodynamic pump design, fluid flow and pressure are generated by a rotor, also referred to as an "impeller," that is rotating inside a stationary pump casing. The torque required to drive the rotor is provided by an external motor and transmitted through a rotating shaft to the rotor that rotates within a pump housing. Similarly, in the case of a conventional turbine design, fluid flow and pressure are applied to a rotor, which in the case of a turbine is also referred to as a "runner," causing the rotor to rotate inside of a stationary turbine casing, and the rotation and torque generated by the rotor are transmitted through a rotating shaft to an external generator.

One of the difficulties of these approaches is that they require the use of dynamic seals to maintain the pressure boundaries at the location where the rotating shaft penetrates the stationary pump or turbine casing. These seals are a source of leakage and other failure modes. In addition, rigid baseplates are required to allow the pump and the motor or turbine and generator to be mounted and aligned with each other, so as to avoid vibration issues. Even with rigid baseplates, nozzle loads on the pump or turbine can cause alignment problems between the motor or generator and the mechanical seals.

These difficulties are avoided by designs that do not include shaft seals. Magnetic coupling drives, for example, do not require dynamic seals on the pump or turbine shaft, because the motor or generator is coupled magnetically through the pump housing to an internal shaft that is supported by product-lubricated bearings located within the housing. However, these designs still require careful alignment of the motor or generator with the rotor housing to couple the motor or generator with the rotor shaft as efficiently as possible. Also, the components used for magnetic coupling add complexity and cost to the design.

Another approach that avoids dynamic shaft seals altogether is to use an integral design, wherein the motor or generator is included within the same housing as the rotor, so that shaft seals are not required. Some of these integral so-called "sealless motor" or "sealless generator" approaches use a radial field motor or generator design, whereby magnets are attached at or near the outer radius of the rotor, which is sealed within a thin-walled "can," and an electromagnetic stator located outside of the sealed can surrounds the rotor. However, radial field designs necessarily require a significant increase in the diameter and length of the rotor housing. Another approach to integral pump designs is to implement an axial field motor or generator design, whereby a disk or "pancake" permanent magnet, brushless DC motor or generator is included within the rotor housing to provide high power density and create the most compact and lightweight single stage pump or turbine units possible.

However, it can be difficult to cool the motor or generator coils of an integral sealless motor pump or sealless generator turbine. Typically, special flow paths must be provided within the housing to shunt some of the working fluid through grooves in submerged bearings and/or through another appropriate path to extract heat arising from the coils of the motor or generator. The shunted working fluid is heated by convection from the stator wall and carries the heat away from the stator to be expelled along with the un-shunted working fluid.

Unfortunately, as the shunted fluid passes through passages adjacent to the stator wall, through a hollow rotating shaft, through the shaft bearings, and/or through other appropriate channels, a phase change may occur due to the combination of fluid heating and/or a pressure drop due to the transition from discharge to suction pressure. The resulting exposure to fluid in the vapor phase can result in motor/generator overheating and/or bearing failure. Furthermore, the requirement of diverting a certain fraction of the pump output or turbine input into a cooling flow necessarily reduces the efficiency of the pump or turbine.

Another disadvantage of pumps and turbines before the present invention that include a mechanically integral motor or generator is that each pump or turbine design necessarily requires a corresponding, integral motor or generator design. Accordingly, when a new pump or turbine design is introduced a new motor or generator design must also be introduced, even if the torque and electrical requirements of the new motor or generator remain unchanged as compared to an existing design. And if it is necessary to simultaneously produce and/or support a plurality of such pumps or turbines, then separate productions and/or inventories must be maintained for the distinct motor and generator designs.

In addition to the issues that are discussed above, another general problem that is encountered in the design of both integral and non-integral pumps and turbines is how to scale up the capacity of an existing pump or turbine design to meet the requirements of a new application, which generally requires redesigning the physical shape and size of the rotor, operating the rotor at a higher speed, and/or adding additional rotors.

The total head that is generated by a pump is a function of the rotor diameter and its rotation speed, while the flow delivery for a given rotor diameter and speed is determined by the rotor width. For a given rotor design, the maximum rotor speed is limited by the amount of torque that the motor can develop. The speed of rotation is also limited by both the frequency limitations of the inverter used to drive the motor and the NPSH (Net Positive Suction Head) available at the inlet of the rotor.

Similarly, in the case of a generator turbine, the generator places a "load" on the turbine rotor according the electromagnetic coupling between the rotating magnets and the generator coils, under the control of an inverter or other control electronics associated with the generator, such that the maximum output of the generator depends on the maximum torque that can be delivered to the generator by the rotor, which for a given fluid flow depends on the rotor diameter and width.

One approach to increasing output of a pump or turbine is therefore to increase the size of the rotor and the capacity of the motor or generator. However, the additional size and bulk that result from this approach can be problematic.

The size and bulk of the rotor casing and other components of a pump or turbine can be reduced, when higher fluid pressures or generator outputs are required, by using small diameter rotors operating at high speeds. However, this approach does not work for sealless motor and generator designs, because the rotor is also a component of the motor or generator. In particular, in axial sealless designs smaller diameter rotors provide smaller available disk areas for mounting permanent-magnets or inductive magnets, thereby limiting the torque that can be developed by the motor, or the electrical power that can be produced by the generator. Another limitation is the relative unavailability of sealless motor designs (magnetic rotors and stators) that can deliver a range of pressures and flow rates, and of sealless generator designs that operate efficiently over a range of pressures and flow rates.

Accordingly, for an axial motor sealless pump or turbine, the pump head or turbine output provided by a rotor can only be increased by enlarging the diameter of the rotor. However, this approach increases the bulk of the apparatus, because it requires use of a larger and thicker rotor casing and other structural components to contain the larger components and higher fluid pressures.

Increasing output by expanding the number of rotors can also be problematic for any pump or turbine design. In a non-integral, multi-stage pump or turbine, a single, large motor provides torque to a plurality of rotors through a common shaft, or a single, large generator receives torque from a plurality of rotors through a common shaft. This approach typically requires a large and bulky motor or generator, and further requires that the shaft must be enlarged in diameter and increased in length as the number of rotor stages is increased, so that the combined torque and weight of all of the rotors can be accommodated.

Whether configured in a horizontal or a vertical arrangement, these long shafts with multiple rotor stages require larger bearings and increase the likelihood of bearing failures. In addition, the long shafts of multi-stage pumps can lead to various roto-dynamic issues related to shaft deflections and critical speeds. Because of these issues, and for other reasons, each multi-stage pump design is applicable only to a specified maximum number of stages, and cannot be easily scaled to accommodate requirements for different numbers of stages. Instead, scaling of an existing design typically requires a new pump or turbine design.

Furthermore, the elongated shaft, multi-stage approach requires that all of the rotors rotate at the same speed, which can limit the efficiency and/or NPSH (net positive suction head) performance of the design. In addition, a failure of any one stage in a multi-stage pump will cause an immediate and total failure of the entire pump or turbine.

Of course, one alternative to designing and implementing a multi-stage integral or non-integral pump or turbine is simply to interconnect a plurality of single-stage pumps or turbines in series and/or parallel. In the case of pumps, the output of each pump in series becomes the input of the next pump, which further increases the pressure, while the outputs of pumps configured in parallel are combined to increase output flow. In the case of turbines, the fluid flows through the rotors, either in series or in parallel, and the electrical outputs of the turbine generators are combined in series and/or in parallel to create a higher total output voltage and/or current.

However, this approach of combining a plurality of pumps or turbines into a multi-stage apparatus requires the use of bulky and complex fluid interconnections or manifolds, so that excessive space is consumed. In addition, the reliability of the apparatus is reduced, because the number of hoses and/or other fluid connections, and therefore the opportunities for leaks and/or other failure modes, increases as the number of pumps or turbines is increased.

It has been suggested that a sealless disk motor pump might include more than one motor within a common housing. However, the fluid interconnections and motor/generator cooling requirements of a sealless disk motor design tend to limit this approach to only two stages at most.

For example, with reference to FIG. 1, one approach that has been proposed includes two centrifugal pump stages within a single sealless motor design 100, whereby each stage is driven by its own motor 102, and whereby the two stages are positioned back-to-back, such that the two motors 102 are included within a common central space within the casing 112, so that they can be cooled by a common process flow path 104. In the example shown in FIG. 1, the two rotors 106 face in opposite directions, and each includes permanent magnets 110 attached to a rear side thereof.

In some versions of this approach, the motors 102 are controlled by separate variable frequency drives ("VFD's") 114 and each of the rotors 106 rotates about a separate, fixed shaft 108. In other versions, the motors share a common controller and/or shaft. By placing the two motors 102 within the same volume, the cooling path 104 in this approach is only slightly more complex than the cooling path in a single stage integral motor design, and the loss of efficiency due to diverting flow into the cooling path is minimized. However, this approach is, by its nature, limited to only two stages, and there is no obvious approach for expanding the design beyond the two-stage limit.

What is needed, therefore, is an integral, "sealless" pump or sealless turbine design that is compact and modular, such that more than two of the pump or turbine modules, preferably up to an arbitrarily large number, can be combined in series without bulky fluid interconnections therebetween. It is further preferable in embodiments that little or no process fluid be diverted away from the primary flow path for cooling the motor or generator within each module, that the rotors in the modules rotate separately, and/or that the motors/generators in the modules be separately controllable. It is still further desirable that the motor or generator that is integral to the pump or turbine module should itself also be modular, so that the same motor or generator design can be incorporated into different pump or turbine designs.

SUMMARY OF THE INVENTION

The present invention is a "sealless" motor pump or sealless generator turbine that is configured as a highly compact module having a "concentric" flow design. The disclosed modular design enables more than two of the pump or turbine modules, preferably up to an arbitrarily large number, to be combined in series without bulky fluid interconnections therebetween, and with the rotor in each module rotating separately on its own shaft or other supports. In embodiments, little or no process fluid is diverted away from the primary flow path for cooling the motor or generator within each module. In various embodiments, the rotors in the module motors or generators are separately controllable. And in embodiments, the motor or generator that is integral to the pump or turbine modules is itself modular, so that the same motor or generator design can be incorporated into different pump or turbine designs.

According to the present invention, the coil housing, i.e. stator housing, of the motor or generator is concentrically surrounded by the outer housing of the module, i.e. the module housing, thereby creating an annular space therebetween surrounding the motor or generator coils and centered on a primary axis of the motor or generator. Working fluid enters the module axially through a proximal inlet that is located substantially along the primary axis, and is discharged axially from the module through a distal outlet that is also located substantially along the primary axis. Within the module, the working fluid flows symmetrically past the stator housing that surrounds the motor or generator coils through either a plurality of substantially identical flow passages arranged symmetrically about the circumference of the stator housing, or through a single, annular flow passage that surrounds the stator housing. This symmetric distribution of the flow passage(s) in the region surrounding the motor or generator coils provides a compact design wherein the module housing is only moderately larger in diameter than the stator housing of the motor or generator.

In various embodiments suitable for use with relatively cool working fluids, the flow passages or single annular flow passage is/are in direct thermal contact with the housing of the motor or generator coils, thereby directly cooling the motor or generator coils. In some of these embodiments, more than 80% of the working fluid is brought into thermal contact with the motor or generator coil housing, and at least 20% of the motor or generator coil housing is in thermal contact with the working fluid. In various embodiments, more than 90% of the working fluid is brought into thermal contact with the motor or generator coil housing, and at least 50% of the motor or generator coil housing surface is in thermal contact with the working fluid.

In multi-passage embodiments suitable for use with hot working fluids, thermal insulation is provided between each of the plurality of substantially identical flow passages and the housing of the motor or generator coils. In some of these embodiments, a cooling fluid is circulated around the motor or generator coil housing in an annular space, such that the cooling fluid is in direct contact with the housing of the motor or generator coils, thereby cooling the motor or generator coils and protecting them from any residual heating by the hot working fluid.

In other embodiments where hot working fluid flows through a single, annular flow passage, thermal insulation is provided between the annular flow passage and the housing of the motor or generator coils, and in some of these embodiments a separate cooling fluid is circulated through a cooling annulus or cooling passages provided beneath the thermal insulation.

In embodiments, the concentric design of the present invention is implemented as a highly compact module that can be used alone or in series with a plurality of identical modules to form a multi-stage pump or turbine in which each stage includes both a rotor and an associated motor or generator. This modular design allows combination of the modules into an arbitrary number of stages without adding additional complexity or complications to the design, operation, and maintenance of the apparatus. In particular, because the rotor in each module is supported by a dedicated shaft or other supports, high stage counts do not raise any issues regarding shaft size, shaft deflection, roto-dynamics, bearing loads, motor alignment, or alignment between stages.

In some embodiments, the rotor of each module is fixed to a rotating shaft. In other embodiments, the shaft of each module is fixed, and the rotor rotates about the shaft, e.g. on bearings. For example, the shaft for each module can be inserted through the rotor hub and threaded into the module housing, which facilitates easy assembly and maintenance without special tools.

Certain embodiments include modules having an inverted rotor/stator configuration, whereby the rotor and the stator can both rotate independently from each other in opposite directions. Some embodiments include stators and/or diffusers that rotate individually. In some of these embodiments, the diffusers are implemented in a manner similar to the disclosure of patent application U.S. Ser. No. 15/101,460, which is included herein by reference in its entirety for all purposes.

In still other embodiments, the disclosed module does not include a shaft. Instead, a wear ring clearance on the front of the rotor acts as the primary radial and axial bearing. Torque is thereby transmitted directly from or to the electromagnet stator coils of the motor to the rotor, or electromagnetic energy is transferred directly from the rotor to the generator, without the use of a rotating shaft.

In some embodiments, the disclosed pump or turbine module includes a radial motor or generator design, whereby a plurality of permanent magnets are attached at or near the periphery of the rotor, and the rotor is surrounded by an electromagnet stator. In other embodiments, the disclosed module includes an axial, "disk" or "pancake" motor or generator, whereby a plurality of permanent magnets are attached to a rear side of the rotor, and are caused to pass close to electromagnetic coils of an axially adjacent stator as the rotor is rotated. Some embodiments that include permanent magnet motors or generators further include variable speed drives that enable the synchronous operating speeds of the modules to rise above 3600 rpm.

Other embodiments include induction motors or generators that utilize non-permanent magnets, such as "squirrel cage" rotor coils in which currents are induced by the stator electromagnets during pump or turbine operation.

In embodiments, the motor or generator coils are sealed from the working fluid using static sealing methods, which eliminates any need for dynamic mechanical seals, and avoids the problems of alignment, leakage, and/or maintenance that would otherwise arise therefrom.

Various embodiments having centrifugal designs include radial flow rotors. Some of these embodiments include rotors with specific speeds up to 2,000 US units, 4000 US units, or even 5000 US units. Other embodiments include stages with radial flux motor or generator designs and higher specific speed mixed flow rotor designs.

In embodiments, the rotors are axially and radially located by product-lubricated bearings provided in each modular stage, which allows the bearings in each stage to be designed to handle the loads from that stage only. This approach completely eliminates the risk of overloading bearings due to combined stage loading in a multistage arrangement, and provides a design that is more compact because there is no need to use oversized bearings. Using the working fluid as a lubricant for the bearings in embodiments also eliminates the need for an external oil lubrication system and greatly simplifies the overall pump design. In embodiments, combined radial and one-way thrust bearings are used in place of separate axial and radial bearings.

In various embodiments, the motors or generators in a multi-stage apparatus are separately controllable. Embodiments include a plurality of variable frequency drives (VFD's), and in some of these embodiments the motor or generator in each stage is independently controlled by a dedicated VFD. One of the key benefits in some of these embodiments is that the first stage can run at lower speeds than the rest of the apparatus, so as to accommodate low net positive suction head ("NPSH") and off-peak conditions. In some applications, varying the speed of only the final stage provides a useful approach precisely controlling the output pressure and/or flow.

Providing individual VFD drives for each stage can also serve as a fail-safe redundancy, whereby if one stage fails, the rest will continue to operate and the apparatus will continue to function. The continued function after failure of a pump or turbine stage may be with reduced head and flow, or the speed of the remaining stages can be increased to compensate for the lost head and flow of the failed stage. This approach creates a failure scenario wherein the pump or turbine continues to operate, possibly at reduced head and flow, until an operator, after becoming aware of the stage failure, has time to safely shut down the system. In contrast, the failure of one stage in a traditional pump or turbine would result in failure of the entire apparatus, with a complete loss of performance and a sudden, uncontrolled shutdown of the system. Using a sensor-less motor along with an appropriate VFD also reduces the instrumentation required on each stage in various embodiments.

In various embodiments, the motor or generator that is included in each module is modular in design, whereby a given motor or generator design can be incorporated into a plurality of different pump or turbine designs. In particular, the plurality of permanent magnets or other magnetic devices that are included in the motor or generator included in a detachable, modular magnet structure that can be axially and rotationally constrained to be cooperative with the rotor of the pump or turbine. Axial and rotational constraint of the magnet structure can be by any means known in the art that is able to constrain the magnet structure both axially and rotationally in relation to the rotor. Embodiments include a snap ring that axially constrains the magnet structure and one or more pins that rotationally fix the magnet structure to the rotor. Other embodiments include threaded attachment of the magnet structure to the rotor or attachment by screws or bolts, whereby the magnet structure is constrained both axially and rotationally. Some of these embodiments further include an electrical port that can form a sealed conduit between the motor or generator housing and the pump or turbine housing so as to provide a path for electrical leads and/or control lines to extend between the stator and the environment external to the pump or turbine.

In embodiments, the magnet structure and/or the stator portion of the motor or turbine that contains the stator coils is/are modular and fully sealed, thereby requiring only mechanical attachment to the housing of the pump or turbine in proximity to each other. In various embodiments, sealed modular magnet structures and/or sealed modular stator assemblies of the present invention can be implemented in different combinations, rendering it unnecessary to configure new instantiations of the magnet structure and/or stator assembly each time a new pump or turbine module is designed.

A first general aspect of the present invention is a sealless pump or turbine module having an integral motor or generator. The module includes an inlet located at a proximal end of the module, the inlet being on a central axis of the module, an outlet located at a distal end of the module, the outlet being on the central axis of the module, a module housing surrounding the module, a rotor suspended within the module housing, and a motor within the module housing configured to drive a rotation of the rotor, or a generator within the module housing configured to be driven by rotation of the rotor.

The motor or generator includes a stator within a sealed stator housing, the stator comprising at least one electromagnet directed toward the rotor, said stator housing being removably axially, radially, and rotationally fixable to the module housing, an electrical port formed in the stator housing and configured to form a seal with the module housing when the stator housing is fixed to the module housing, the electrical port providing a sealed passage through which electrical conductors can be directed for interconnection between the at least one electromagnet and apparatus that is external to the module housing, a plurality of magnetic devices assembled in a magnet structure that is removably constrained to be axially fixed and rotationally cooperative with the rotor, the magnetic devices being configured by the magnet structure to pass in proximity to the at least one electromagnet as the rotor rotates, and a flow path symmetrically distributed about the stator housing, In addition, the module is configured to direct a flow of working fluid from the inlet through the flow path to the outlet such that the working fluid is symmetrically distributed about the stator housing as it flows past the stator within the flow path.

In embodiments, the flow path is an annular flow path surrounding the stator housing.

In any of the above embodiments, the flow path can include a plurality of flow passages arranged symmetrically about the stator housing.

In any of the above embodiments, the rotor can be suspended by a rotatable shaft, and the rotor can be fixed to the shaft, or the rotor can be suspended by a fixed shaft, and the rotor can be configured to rotate about the shaft.

In embodiments where the rotor is suspended by a fixed shaft, and the rotor is configured to rotate about the shaft, the rotor can be supported on the fixed shaft by a pair of bearings, one of which maintains an axial position of the rotor while the other of which provides radial support of the rotor, or the rotor can be supported axially and radially on the fixed shaft by a single, one-way thrust bearing. In any of these embodiments the rotor can be supported on the fixed shaft by at least one bearing that is lubricated by the process fluid. In any of these embodiments, the fixed shaft can be fixed to at least one of the stator housing and the module housing by threaded attachment.

In any of the above embodiments, the magnetic devices can be permanent magnets, or squirrel cage coils.

In any of the above embodiments, the flow path can extend over at least 50% of a surface of the stator housing, and at least 90% of the working fluid that flows through the module from the inlet to the outlet is caused to flow through in direct thermal contact with the stator housing.

In any of the above embodiments, the module can be configured to require all of the working fluid flowing from the inlet to the outlet to flow through the flow path.

Any of the above embodiments can further include thermal insulation interposed between the flow path and the stator housing, and a cooling fluid path formed between the thermal insulation and the stator housing, the cooling fluid path being in thermal communication with the stator housing and configured to enable an exchange of heat between the stator housing and a cooling fluid flowing through the cooling fluid path.

In any of the above embodiments, the stator can be configured to rotate independently of the rotor and in a direction that is opposite to a rotation of direction of the rotor.

Any of the above embodiments can further include a diffuser that is cooperative with the rotor but is driven by a separate diffuser motor and is thereby able to rotate independently of the rotor.

In any of the above embodiments, the electromagnet of the stator can be directed toward a radial periphery of the rotor, and the magnetic devices can be fixed near the radial periphery of the rotor, or the electromagnet of the stator can be directed toward a side of the rotor, and the magnetic devices can be fixed to the side of the rotor or to a disk that is coaxial with and proximal to the side of the rotor.

And in any of the above embodiments, the magnet structure can be sealed, thereby excluding the working fluid from reaching the magnetic devices.

A second general aspect of the present invention is a multi-stage apparatus comprising a plurality of interconnected modules. Each of the modules includes an inlet located at a proximal end of the module, the inlet being on a central axis of the module; an outlet located at a distal end of the module, the outlet being on the central axis of the module; a module housing surrounding the module; a rotor suspended within the module housing.

Each of the modules further includes a motor within the module housing configured to drive a rotation of the rotor, or a generator within the module housing configured to be driven by rotation of the rotor. The motor or generator includes a stator within a sealed stator housing, the stator comprising at least one electromagnet directed toward the rotor, said stator housing being removably fixable axially, radially, and rotationally to the module housing; an electrical port formed in the stator housing and configured to form a seal with the module housing when the stator housing is fixed to the module housing, the electrical port providing a sealed passage through which electrical conductors can be directed for interconnection between the at least one electromagnet and apparatus that is external to the module housing; a plurality of magnetic devices assembled in a magnet structure that is removably constrained to be axially fixed and rotationally cooperative with the rotor, the magnetic devices being configured by the magnet structure to pass in proximity to the at least one electromagnet as the rotor rotates; and a flow path symmetrically distributed about the stator housing.

In addition, each of the modules is configured to direct a flow of working fluid from the inlet through the flow path to the outlet such that the working fluid is symmetrically distributed about the stator housing as it flows past the stator within the flow path.

In embodiments of this general aspect, at least two of the motors or generators of the modules can be independently controlled so as to cause the corresponding rotors to rotate at different rates. And in some of these embodiments the two, independently controlled motors or generators are controlled by separate variable frequency drives.

In any of the above embodiments of this general aspect, the modules can be configured such that the apparatus as a whole is able to continue functioning as a pump or as a turbine despite failure of at least one of the modules included in the apparatus.

Any of the above embodiments of this general aspect can further include control electronics that provide shared support to at least two of the modules.

In any of the above embodiments of this general aspect, the plurality of interconnected modules can include at least three interconnected modules.

And in any of the above embodiments of this general aspect, the magnet structure in each of the modules can be sealed, thereby excluding the working fluid from reaching the magnetic devices.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 2C is an exploded sectional view from the side drawn to scale of one of the rotor assemblies in an embodiment similar to FIG. 2B;

FIG. 2H is a simplified cross-sectional view of an embodiment that includes an annular flow path through the annular space;

FIG. 2J is a simplified cross-sectional view of an embodiment that includes a plurality of flow paths that are equally distributed about the coil housing of the motor or generator and insulated therefrom;

FIG. 6C is an exploded cross-sectional view from the side drawn to scale of the rotor and magnet structure of FIG. 6B;

FIG. 7C is an exploded cross sectional view drawn to scale from the side drawn to scale of the module of FIG. 7B.

DETAILED DESCRIPTION

Figure 1:
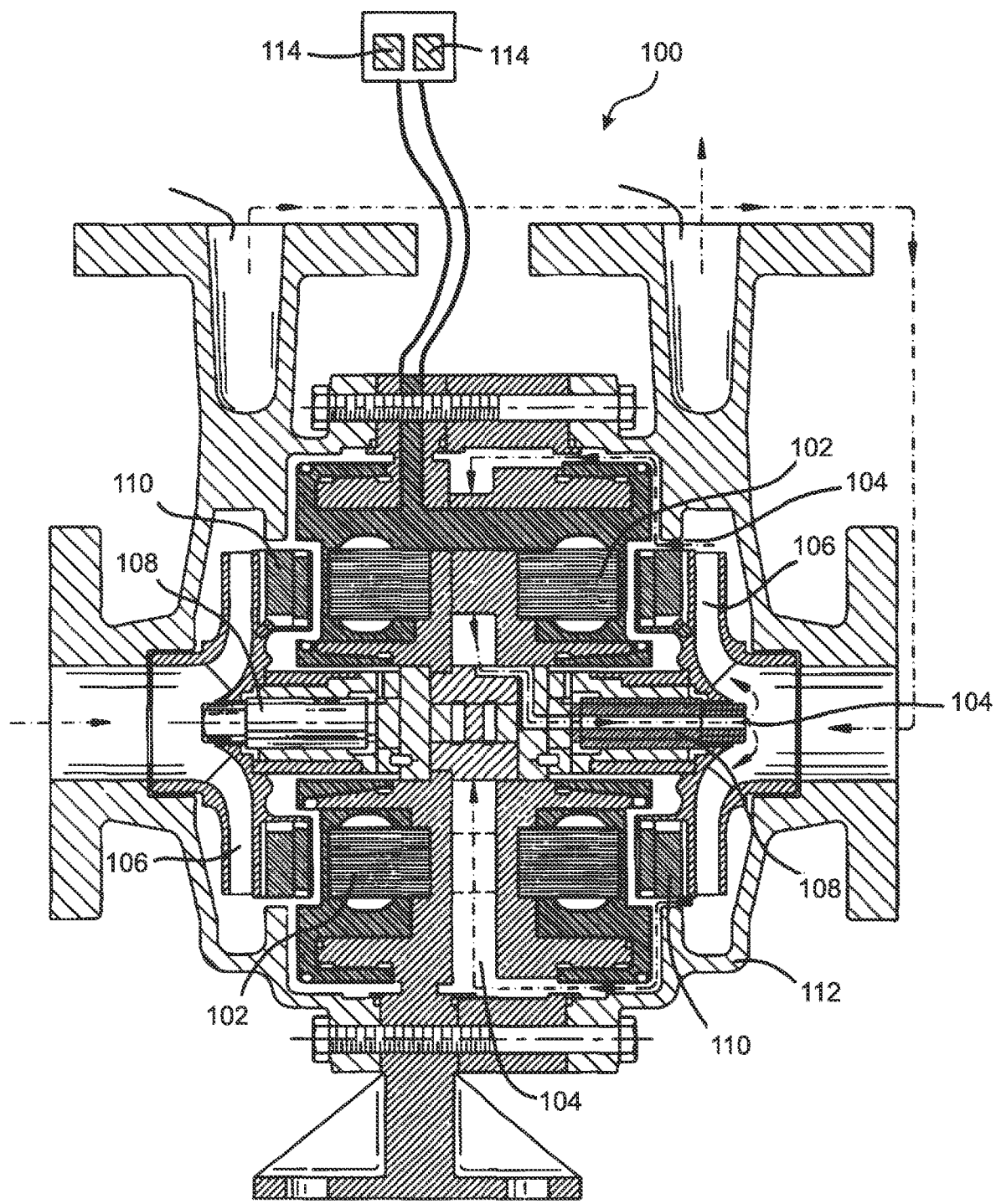
FIG. 1 is a cross-sectional illustration drawn to scale of a prior art two-stage integral motor pump cooled by a dedicated cooling flow.
Figure 2A:
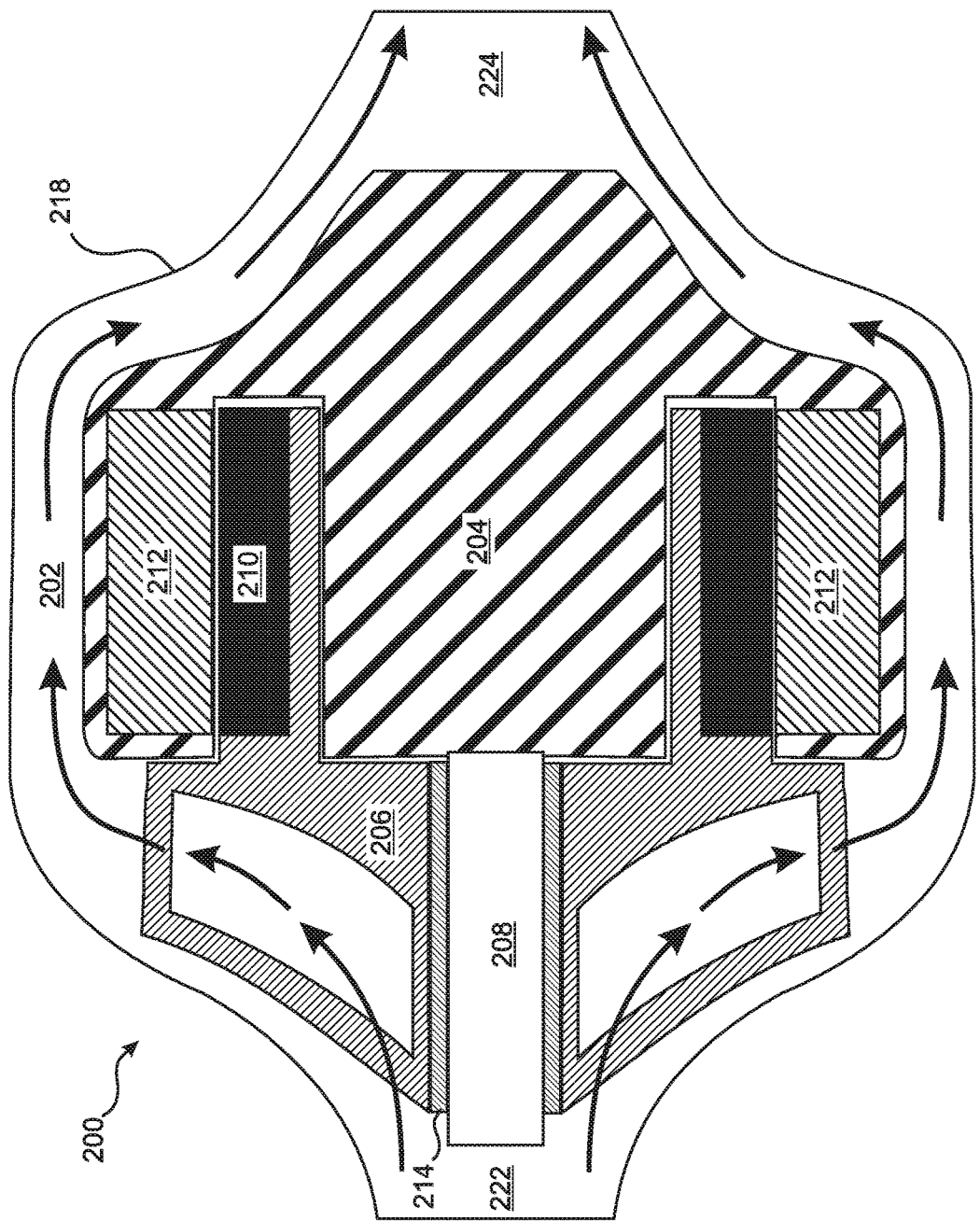
FIG. 2A is a cross-sectional, simplified illustration of a single-stage module of the present invention having a radial motor design.

The present invention is a "sealless" motor pump or sealless generator turbine that is configured as a module having a "concentric" flow design. As an example, a pump embodiment 200 of the present invention is illustrated in FIG. 2A. It can be seen in the figure that the housing 204 of the motor coils 212, i.e. the stator housing 204, is surrounded by the housing 218 of the module, forming an annular space 202 therebetween. According to the present invention, the working fluid is distributed about the annular space 202, either among a plurality of flow passages or through a single annular flow passage. The distribution of the working fluid in the annular space 202 can be symmetric about the stator housing 204. In the embodiment of FIG. 2A, the annular space 202 serves as an annular flow passage 202 through which the working fluid flows from the inlet 222 to the outlet 224.

In the embodiment of FIG. 2A, the annular flow passage 202 is in direct thermal contact with the housing 204 of the motor coils 212. This configuration is suitable for applications where the working fluid is relatively cool. In the illustrated embodiment, the working fluid is directed by the rotor 206 to pass through the annular flow passage 202 over and around the motor coil housing 204 of the module, so that the motor coils 212 are directly cooled by the discharge of the rotor 206, and do not require a separate, dedicated cooling fluid.

Figure 2B:
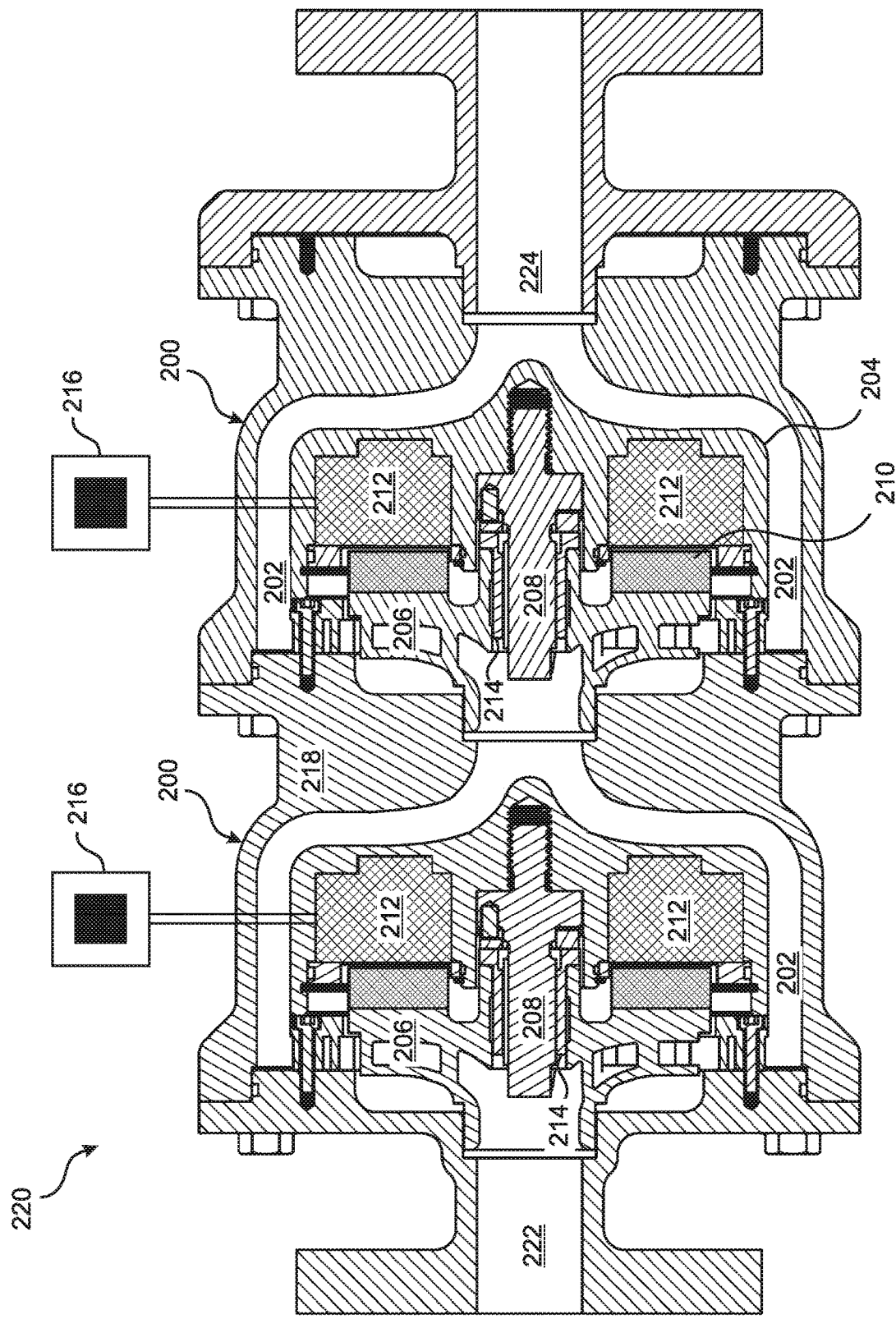
FIG. 2B is a cross-sectional illustration from the side drawn to scale of a two-stage embodiment of the present invention having an axial motor design.

In embodiments, the concentric design of the present invention is implemented as a self-contained, highly compact module that can be used alone, as shown in FIG. 2A, or combined with a plurality of identical modules to form a multi-stage pump or turbine, as shown in FIG. 2B. This modular approach enables extension of the design to an arbitrary number of stages without adding additional complexity or complications to the design, operation, and maintenance of the apparatus. In particular, high stage counts do not raise any issues regarding shaft size, shaft deflection, roto-dynamics, bearing loads, motor alignment, or alignment between stages.

More specifically, FIG. 2B illustrates a two-stage pump embodiment 220 wherein a central axis of the motor 212 in each stage 200 is substantially collinear with the stationary shaft 208 about which the rotor 206 is rotated, such that the process fluid from the rotor 206 flows axially over the stator housing 204 through the annular flow passage 202 formed between the stator housing 204 and the pump housing 218 in each stage 200. While only two stages 200 are shown in FIG. 2B for convenience of illustration, it will be understood that embodiments are extendable to an arbitrary number of pump stages 200.

In some multi-stage embodiments, the rotor 206 in each stage 200 is independently driven, such that the rotor speed of each stage 200 can be separately controlled. For example, a separate variable frequency drive ("VFD") 216 can be dedicated to the control of each stage 200 of the pump.

In the embodiment of FIG. 2B, in each stage 200 of the pump 220 a plurality of permanent magnets 210 are directly attached to a rear side of the rotor 206, and are caused to pass close to electromagnetic coils 212 of an adjacent stator 212 as the rotor 206 is rotated. Rotors 206 in other embodiments include induction motors that utilize non-permanent magnets 210 such as "squirrel cage" rotor coils in which currents are induced by the stator electromagnets 212 during pump or turbine operation. Torque is thereby transmitted directly from the electromagnet motor coils 212 to the rotor 206, or electromagnetic energy is transferred from the rotor to the generator coils, without the use of a rotating shaft. In embodiments, the motor coils 212 are sealed from the working fluid using static sealing methods (not shown), which eliminates any need for dynamic mechanical seals, and avoids the problems of alignment, leakage, and/or maintenance that would otherwise arise therefrom.

Axial and radial locating of the rotor 206 in each stage is provided in the embodiment of FIG. 2B by product-lubricated bearings 214. By using individual bearings 214 for each rotor stage 200, the bearings 214 in each stage 200 can be designed to handle the loads from that stage only, and the risk of overloading bearings from combined stage loading in a multistage arrangement 220 is completely eliminated. Using the working fluid as a lubricant for the bearings 214 in embodiments eliminates the need for an external oil lubrication system and greatly simplifies the overall pump design and maintenance.

Figure 2D:
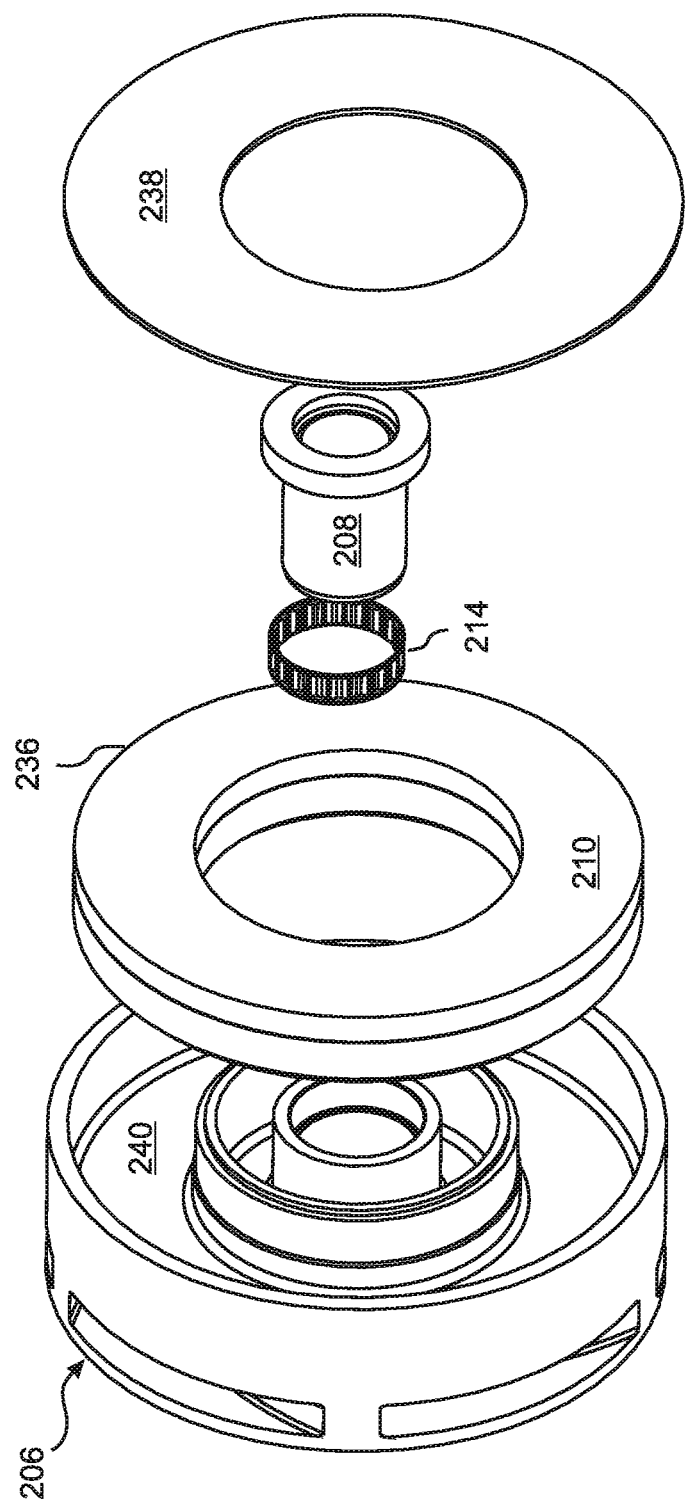
FIG. 2D is an exploded perspective view drawn to scale of the rotor assembly of FIG. 2C drawn to scale.
Figure 2E:
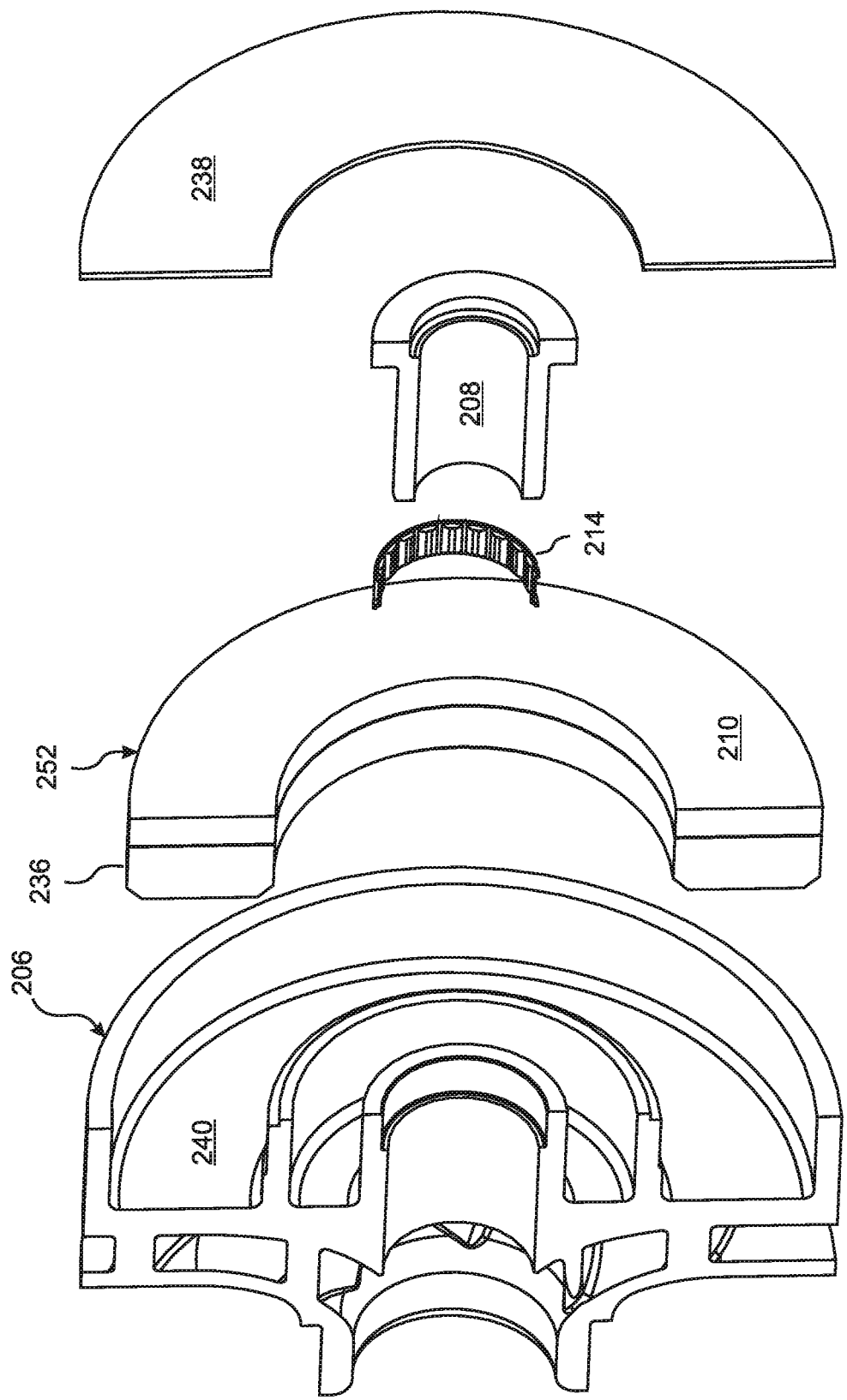
FIG. 2E is an exploded perspective sectional view drawn to scale of the rotor assembly of FIG. 2C.

FIGS. 2C through 2E are, respectively, an exploded sectional view from the side, an exploded perspective view, and an exploded perspective sectional view of one of the rotor assemblies in an embodiment similar to FIG. 2B. In the illustrated embodiment, the magnets 210 are included in a magnet structure 252 that further comprises a magnet "back iron" 236 and a magnet structure cover plate 238. The assembled magnet structure 252 is installed in an annular cavity 240 provided in the rotor 206.

Figure 2F:
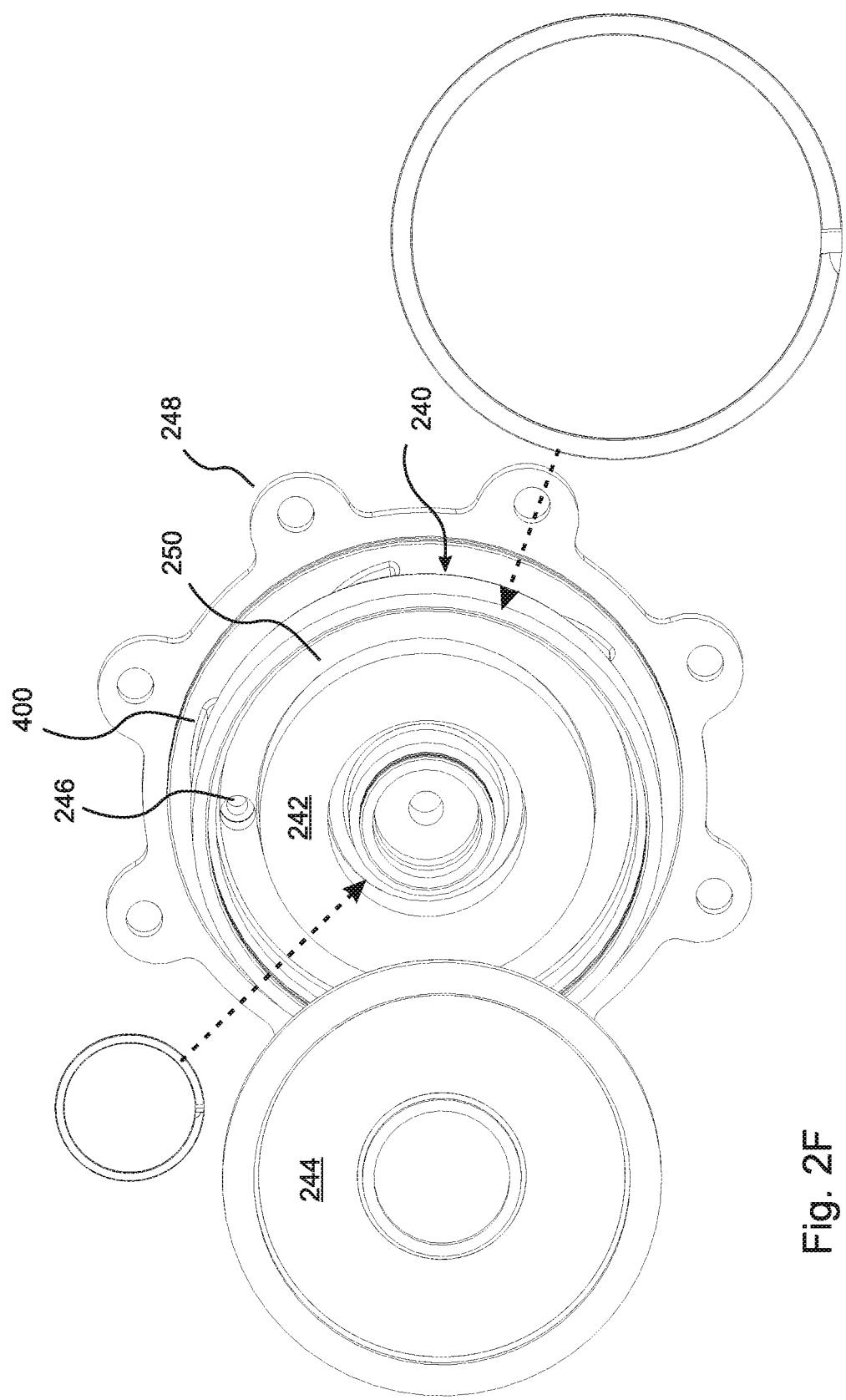
FIG. 2F is a front perspective view drawn to scale of one of the stator assemblies of an embodiment similar to the embodiment of FIG. 2B.
Figure 2G:
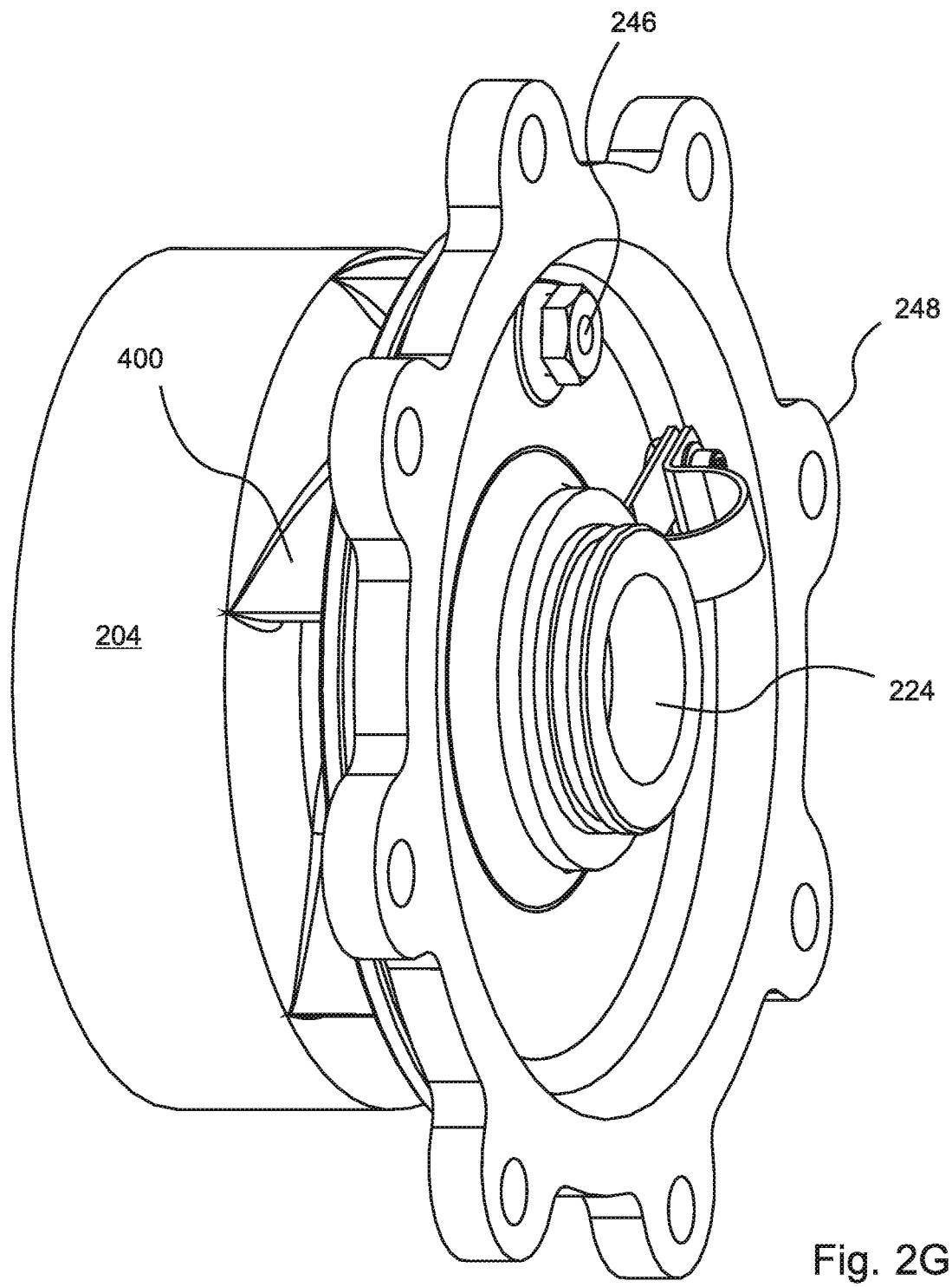
FIG. 2G is a side perspective view drawn to scale of the stator assembly of FIG. 2F.

FIGS. 2F and 2G are front and side perspective views, respectively, of one of the stator assemblies of the embodiment of FIGS. 2B through 2E. The stator coil (not shown) is wound on a form 242 within a coil cavity 250 and covered by a stator cover plate 244. The electrical leads from the coil 212 are directed through an electrical port 246 that extends from the interior of the coil cavity 250 through a stator rear flange that is sealed to the pump or turbine housing 200. In embodiments the stator coil 212 is potted within the coil cavity 250.

In some embodiments, such as FIG. 2A, the rotor 206 in each stage is fixed to a rotating shaft 208. In other embodiments, such as FIG. 2B, the shaft 208 in each stage is inserted through the hub of the rotor 206 and fixed to the motor or generator coil housing 204, and the rotor 206 rotates about the shaft 208, e.g. on bearings 214. This approach facilitates easy assembly and maintenance without special tools. In similar embodiments, the shaft 208 is threaded or otherwise supported by the pump or turbine module housing 218, or by any combination of the pump or pump module housing 218 and the motor or generator stator housing 204.

Certain embodiments include modules 200 having an inverted rotor/stator configuration, whereby the rotor 206 and the stator 212 can both rotate independently from each other in opposite directions. Some embodiments include a plurality of rotors 206 fixed to a common fixed or rotating shaft 208, combined with stators and/or diffusers that rotate individually. In some of these embodiments, the diffusers are implemented in a manner similar to the disclosure of U.S. patent application Ser. No. 15/101,460, which is included herein by reference in its entirety for all purposes.

In still other embodiments, there is no shaft 208, and instead a wear ring clearance on the front of each rotor 206 acts as the primary radial and axial bearing. Torque is thereby transmitted directly from or to the electromagnet stator coils 212 of the motor to the rotor, or electromagnetic energy is transferred from the rotor 206 to the coils 212 of the generator, without the use of a rotating shaft.

FIG. 2H is a simplified cross-sectional illustration of an embodiment having an annular flow passage, similar to FIG. 2A, where the cross section is taken through the pump motor coils 212 perpendicular to the primary axis of the motor.

The embodiments of FIGS. 2A through 2H are suitable for use with relatively cool working fluids, whereby the annular flow passage 202 brings the working fluid into direct thermal contact with the motor or generator coil housing 212, thereby cooling the motor or generator coils. In FIGS. 2A through 2H, more than 80% of the working fluid is brought into thermal contact with the motor or generator coil housing 212, and at least 20% of the motor or generator coil housing 212 is in thermal contact with the annular flow path 202. In various embodiments, more than 90% of the working fluid is brought into thermal contact with the motor or generator coil housing 204, and at least 50% of the motor or generator coil housing surface 204 is in thermal contact with the annular flow path 202.

Figure 2I:
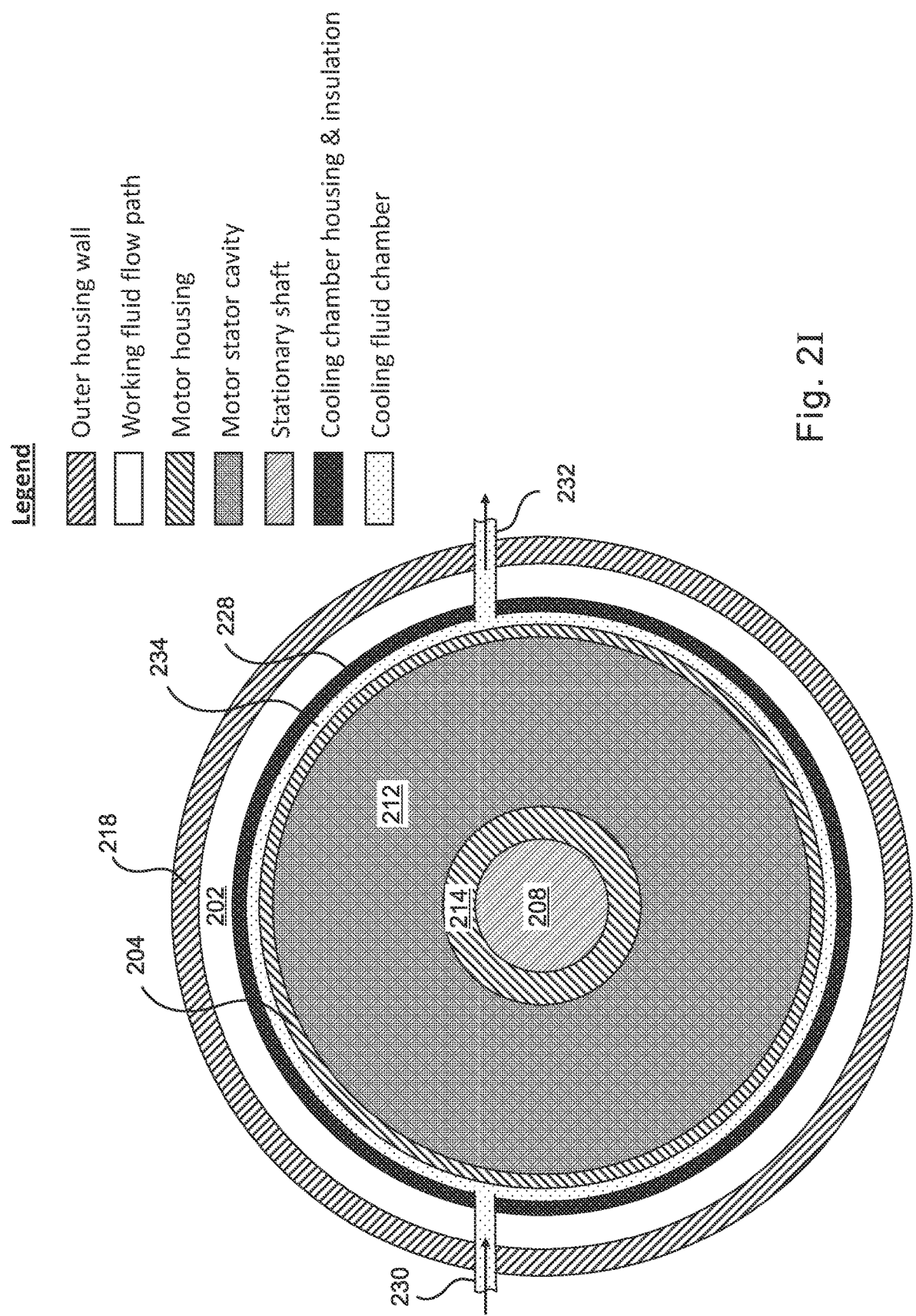
FIG. 2I is a cross-sectional view similar to FIG. 2H, but including an additional concentric layer of thermal insulation and a concentric cooling annular passage.

With reference to FIG. 2I, in some embodiments where a high temperature working fluid is anticipated, the design of FIG. 2H is modified by including an additional concentric layer of thermal insulation 228 between the annular flow passage(s) 202 and the housing 204 of the motor or generator coils 212. In some of these embodiments, a concentric cooling annular passage 234 is further created between the insulation 228 and the coil housing 204, through which a cooling fluid, such as water or a cooling oil, can be circulated from an inlet 230 to an outlet 232.

With reference to FIG. 2J, in other embodiments the working fluid is distributed among a plurality of substantially identical flow passages 226 arranged symmetrically within the annular space 202 about the circumference of the stator housing 204. In the embodiment of FIG. 2J, the flow passages 226 are formed by the module housing walls 218. The embodiment of FIG. 2J further includes a concentric annular layer of insulation 228 and concentric cooling annular passage 234, similar to FIG. 2I.

Figure 3:
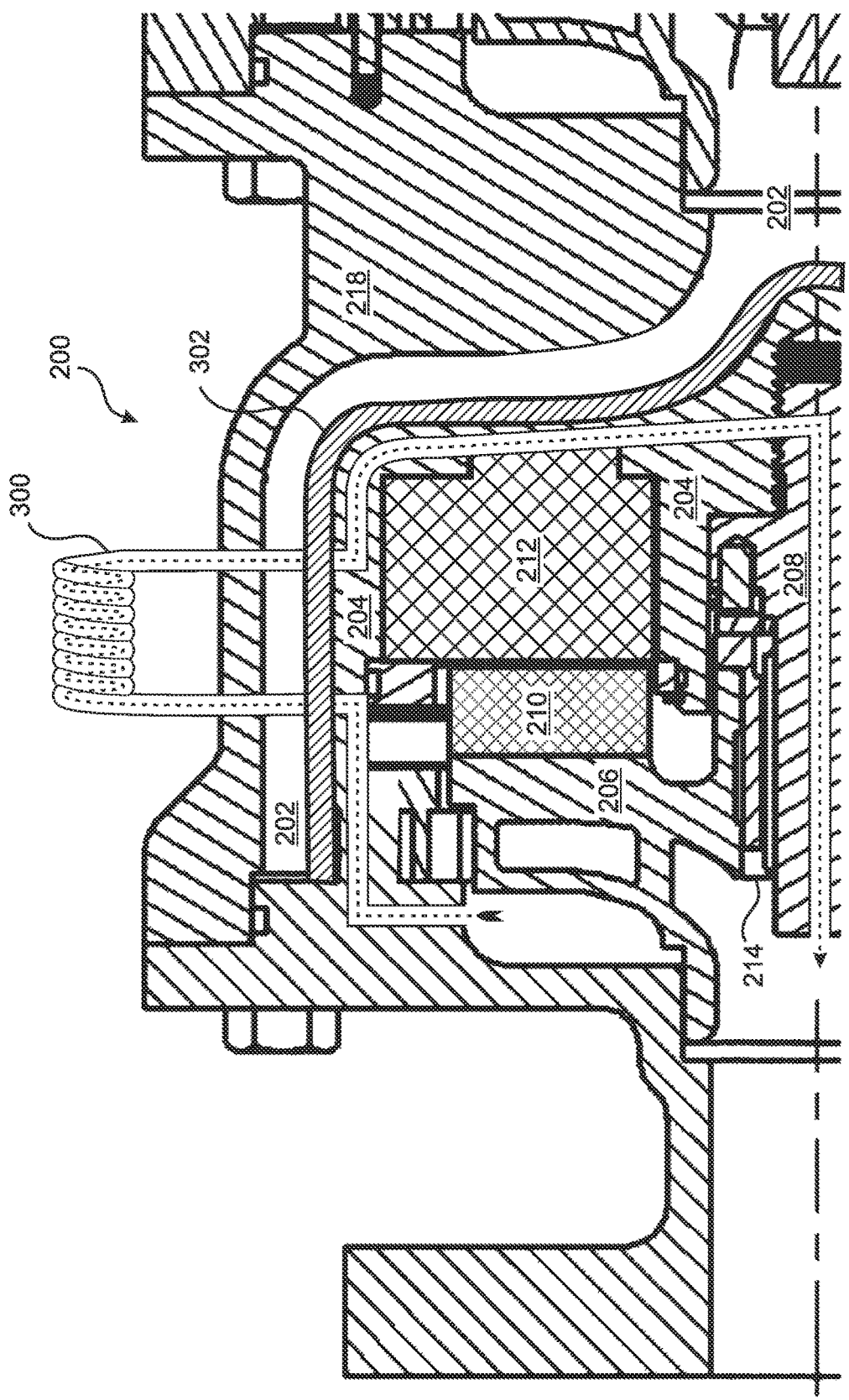
FIG. 3 is a cross-sectional view drawn to scale of an embodiment similar to FIG. 2, but including a separate cooling flow path (cooling path not drawn to scale)

With reference to FIG. 3, in embodiments a small amount of the working fluid is diverted through a separate cooling path 300, where it is cooled and then circulated through the concentric annular cooling passage 234 in thermal contact with the stator housing 204 to cool the motor coils 212. In similar embodiments, a separate cooling fluid, such as water or a cooling oil, is circulated through the cooling path 300 without diverting any of the working fluid.

Fluid cooling of the motor or generator coils 212 in various embodiments allows the system to operate with high temperature working fluids, and also enables the system to provide higher performance limits and greater power density in the overall pump or turbine even if the working fluid is not elevated in temperature.

Figure 4:
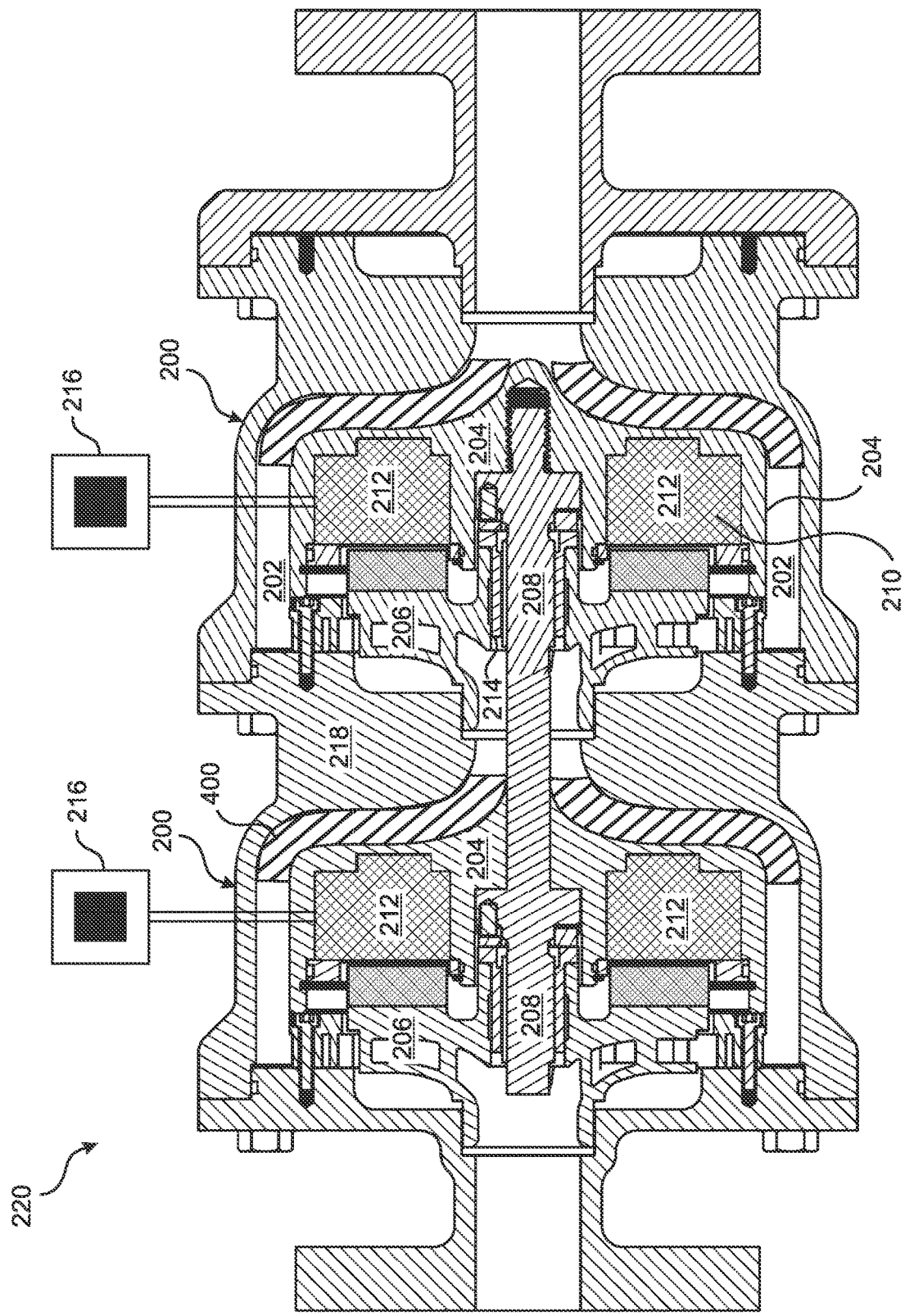
FIG. 4 is a cross-sectional view drawn to scale of an embodiment similar to FIG. 2, but including guide vanes in the process flow path.

With reference to FIG. 4, embodiments include guide vanes 400, either in the annular flow space 202 if the flow passage is annular, or elsewhere in the flow path. In the illustrated embodiment, the guide vanes 400 control the flow of the process fluid in a section of the concentric flow path at the end of the motor or generator coils 212, where the flow path turns radially inward toward the central axis of the module. The guide vanes 400 break the flow path into a plurality of separate but symmetric paths until the flow reaches the central axis and flows axially out through the outlet 224 and into the next stage 200. In embodiments, the guide vanes 400 direct the process fluid within the flow path into close proximity with the motor or generator stator housing 204.

The guide vanes 400 can also provide a casing wall that can be used to route power cables from the sealed motor or generator 212, through the fluid passages 202, and out of the pump casing 218 to the variable frequency control 216. In embodiments, the guide vanes 400 also act as fins to provide additional convective surface area to cool the motor or generator coils 212, and/or to provide space for integral cooling passages 300 connected to an external cooling fluid source.

Figure 5:
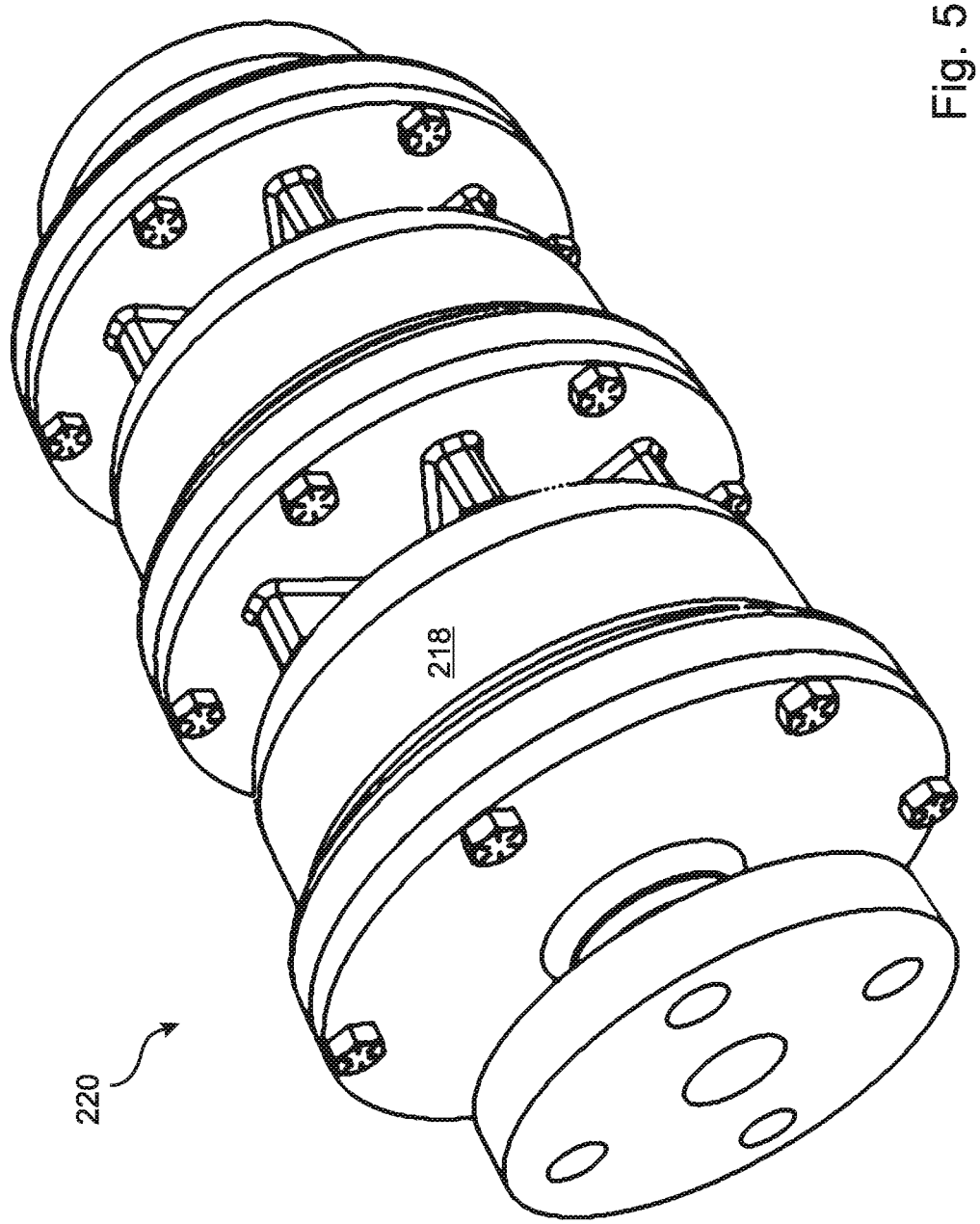
FIG. 5 is a perspective view drawn to scale of the outer housing of the pump of FIGS. 2C through 2G.

FIG. 5 is a perspective view of the exterior of the pump of FIGS. 2C-2G.

Figure 6A:
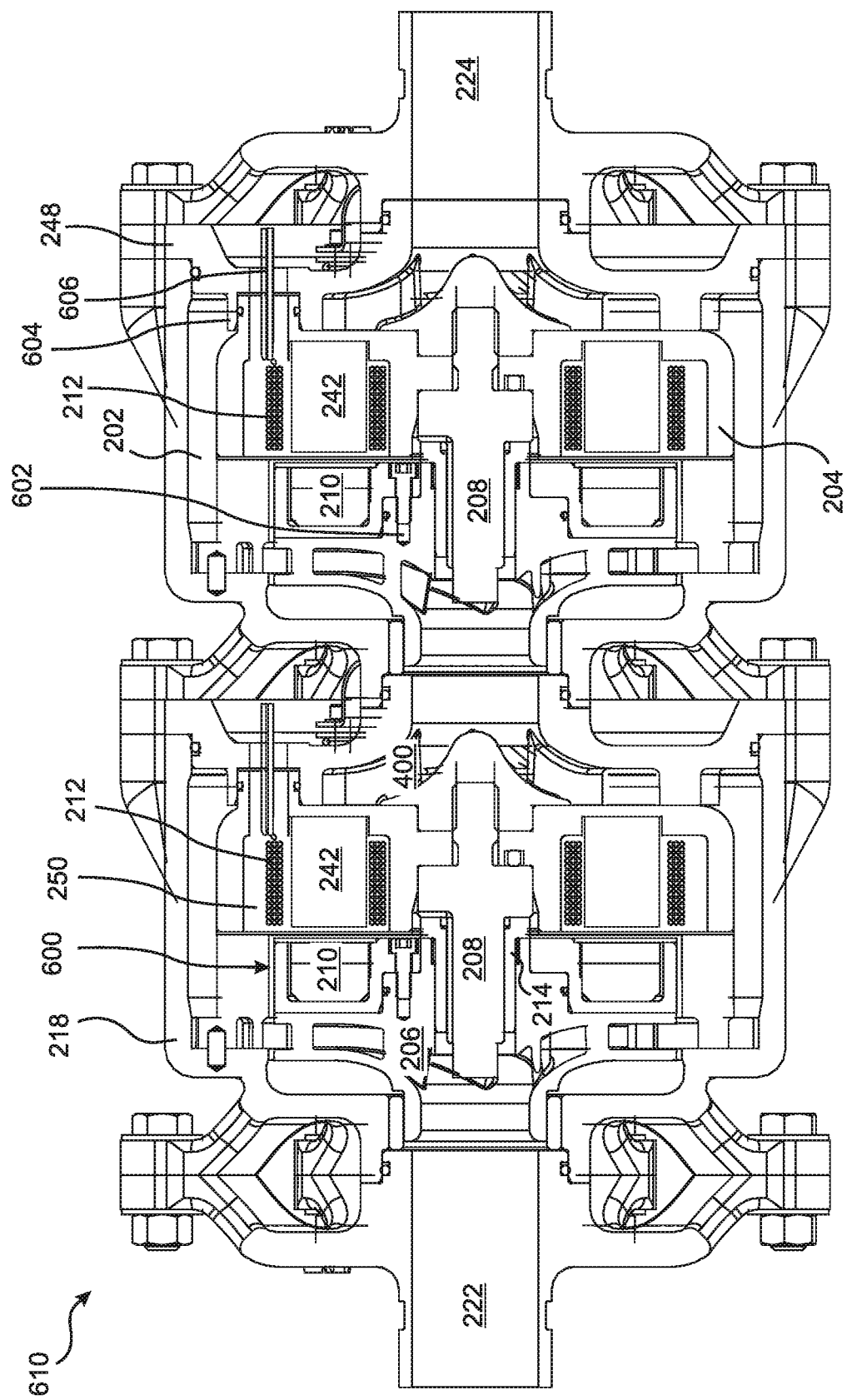
FIG. 6A is a cross-sectional view from the side drawn to scale of a two-stage embodiment of the present invention having a modular motor design.

With reference to FIG. 6A, in various embodiments 610 the motor or generator is modular in design, whereby a given motor or generator design can be incorporated into a plurality of different pump or turbine designs. In the example of FIG. 6, the plurality of magnetic devices 210 that are cooperative with the rotor of the motor are incorporated in a detachable magnet structure 600 that can be fixed to and removed from the rotor 206 of the pump 200. Attachment of the magnet structure 600 to the rotor can be by any means known in the art that is able to constrain the magnet structure 600 both axially and rotationally in relation to the rotor. Some embodiments include threaded attachment of the magnet structure to the rotor that constrains the magnet structure both axially and rotationally. In the embodiment of FIG. 6, the magnet structure 600 is attached to the rotor 206 by bolts 602 that constrain the magnet structure 600 to the rotor 206 both axially and rotationally.

The embodiment of FIG. 6A further includes an electrical port 608 (see FIG. 6H) that provides a sealed conduit extending from the void 250 within the stator housing 204 that contains the stator coil 212 through the rear flange 248 of the stator housing 204, thereby providing a path for electrical leads 606 and/or control lines to extend between the stator coil 212 and the environment external to the pump 200. It can be seen in the figure that the stator housing 204 includes a flange 248 bolted and sealed to a rear end thereof. The flange 248 includes a female socket 604 into which the electrical port 608 is inserted, and with which the electrical port 608 forms an O-ring seal.

In embodiments, the magnet structure 600 and/or the stator portion 204 of the motor or turbine that contains the stator coils is/are modular and fully sealed, thereby requiring only mechanical attachment to the housing 200 of the pump or turbine in proximity to each other. In various embodiments, sealed modular magnet structures 600 and/or sealed modular stator assemblies 204 of the present invention can be implemented in different combinations, rendering it unnecessary to configure new instantiations of the magnet structure 600 and/or stator assembly 204 each time a new pump or turbine module is designed.

Figure 6B:
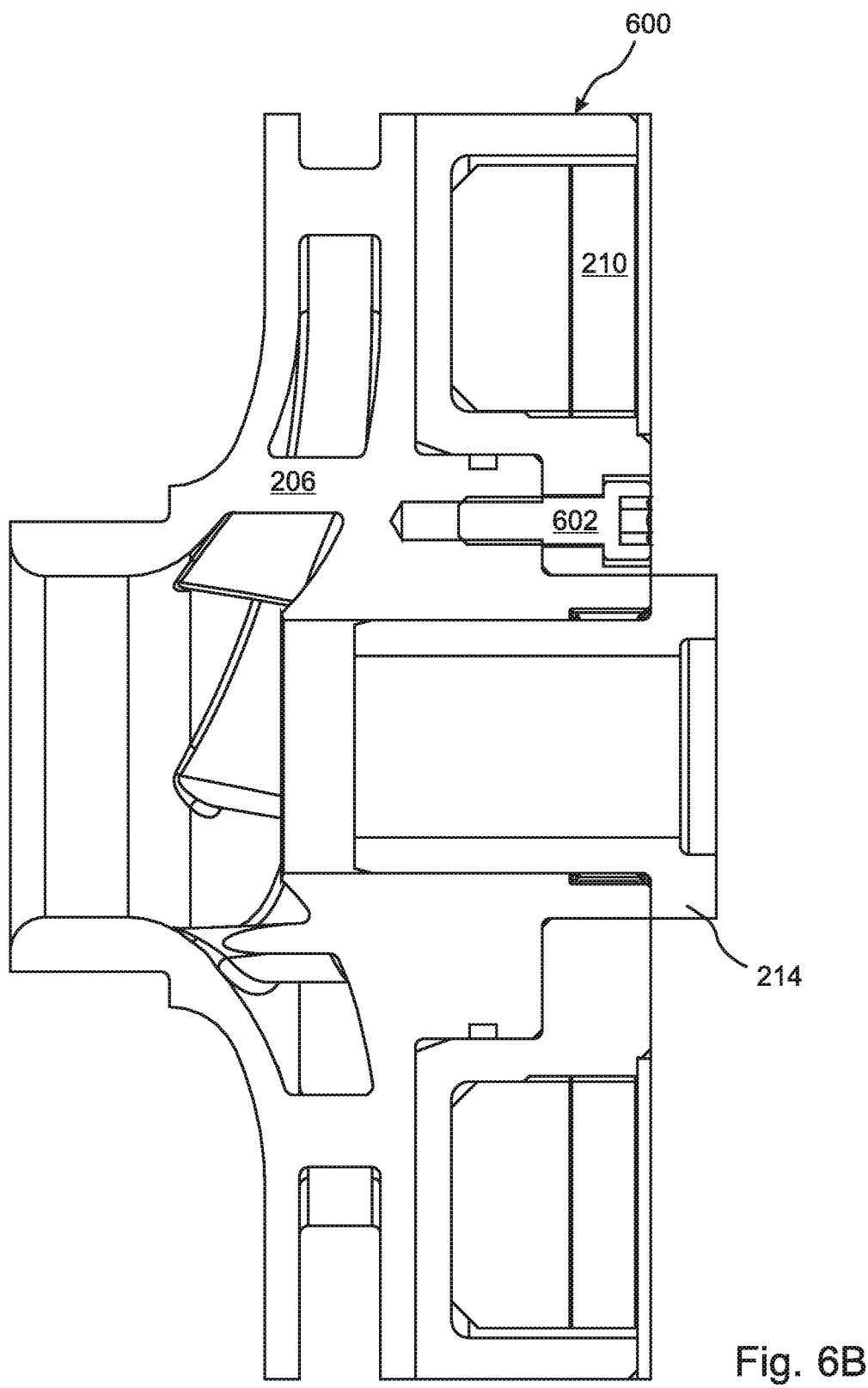
FIG. 6B is a cross-sectional view from the side drawn to scale of one of the rotor and magnet structure assemblies of the embodiment of FIG. 6A.
Figure 6D:
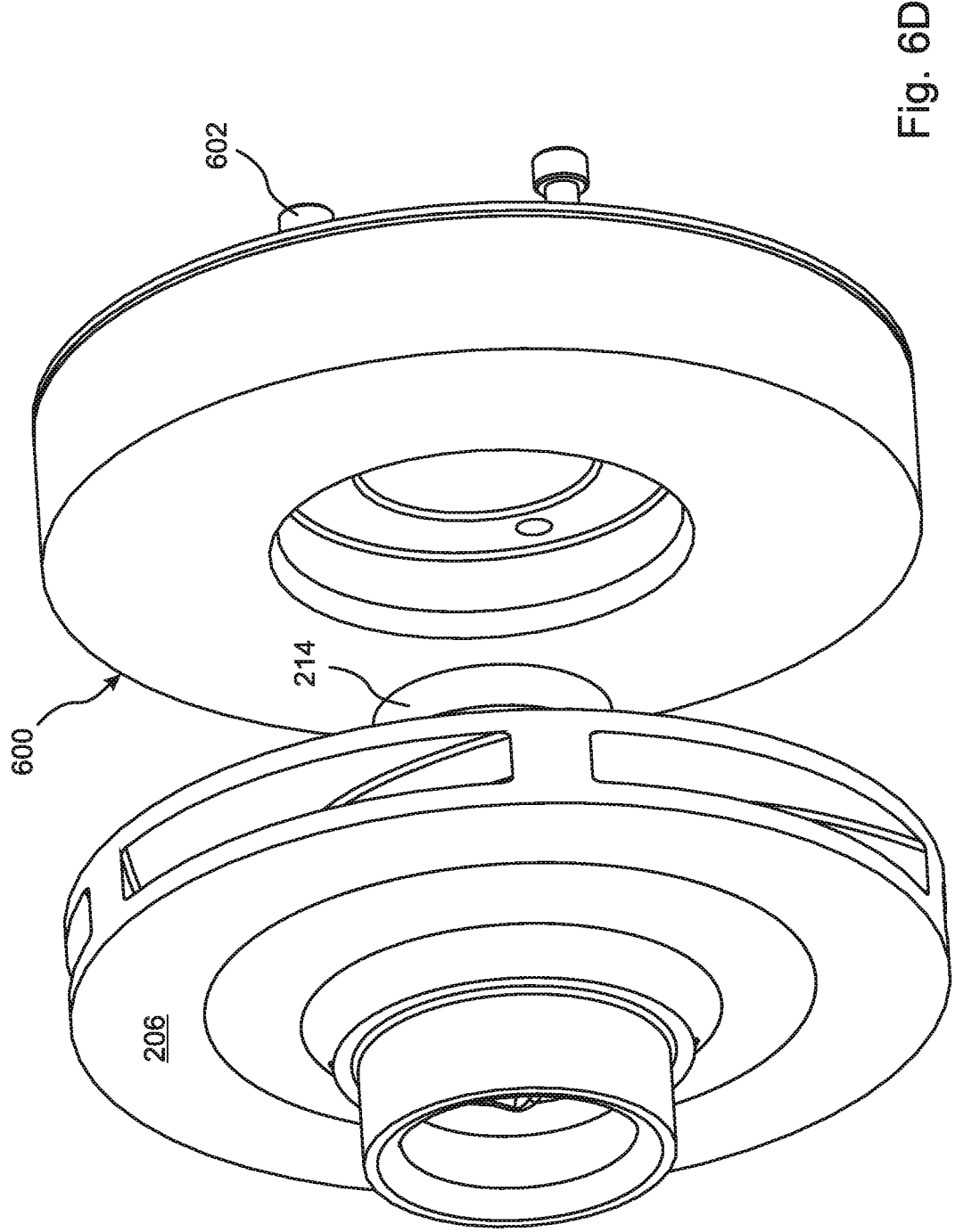
FIG. 6D is an exploded perspective view drawn to scale from the side and front of the rotor and magnet structure of FIG. 6C.
Figure 6E:
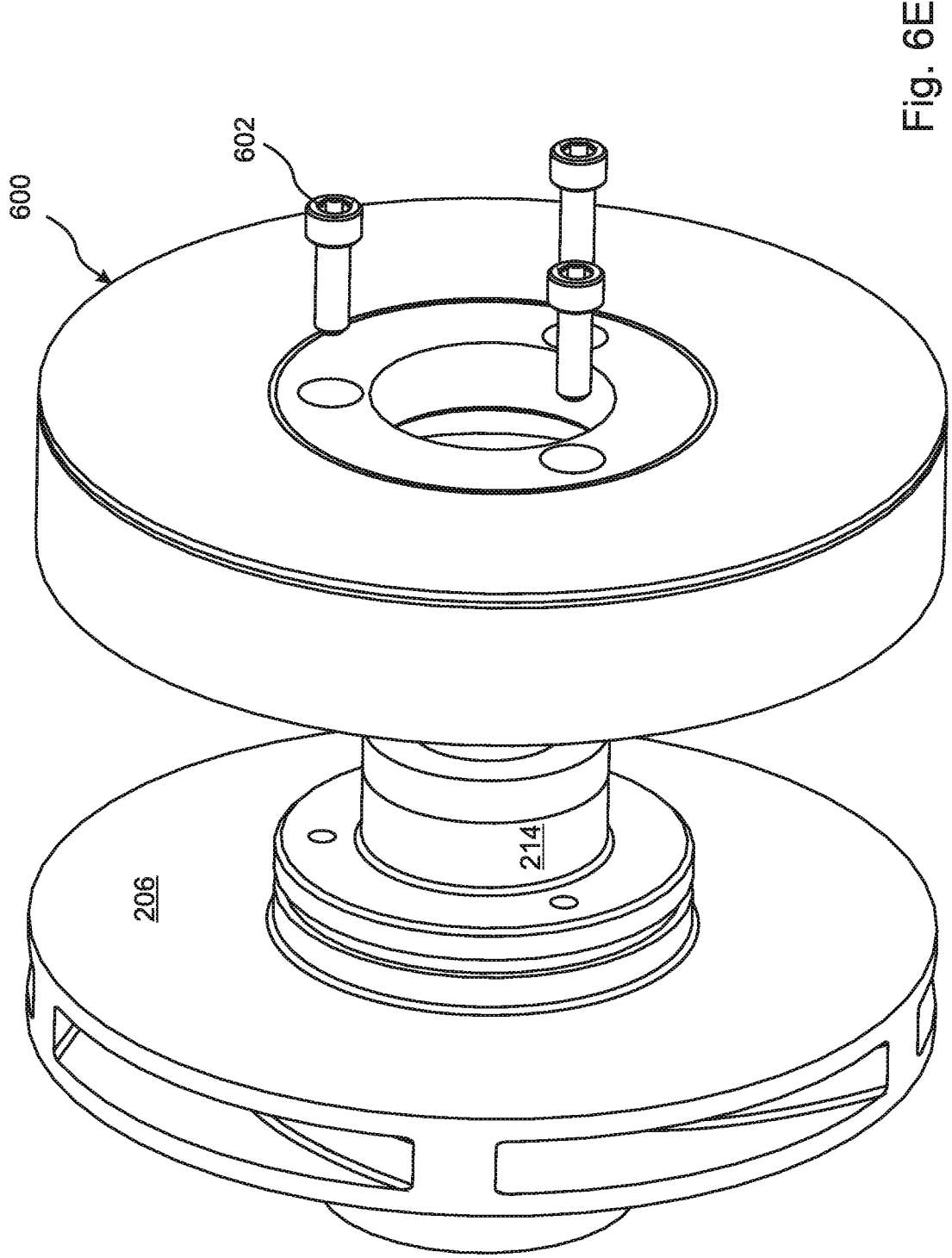
FIG. 6E is an exploded perspective view drawn to scale from the side and rear of the rotor and magnet structure of FIG. 6D.
Figure 6F:
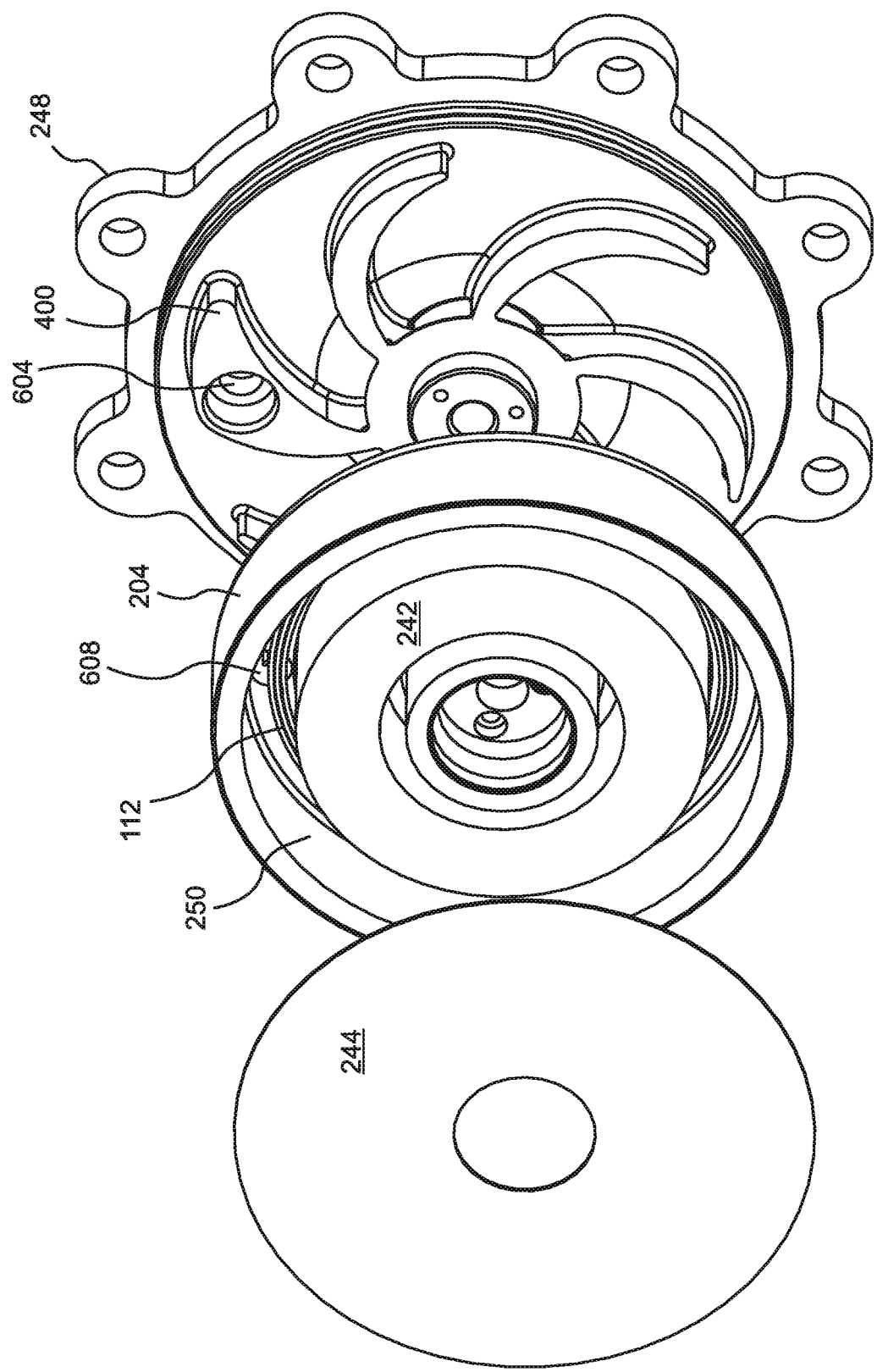
FIG. 6F is an exploded perspective view drawn to scale from the side and front of one of the stator assemblies of FIG. 6A shown with the rear plate removed.
Figure 6G:
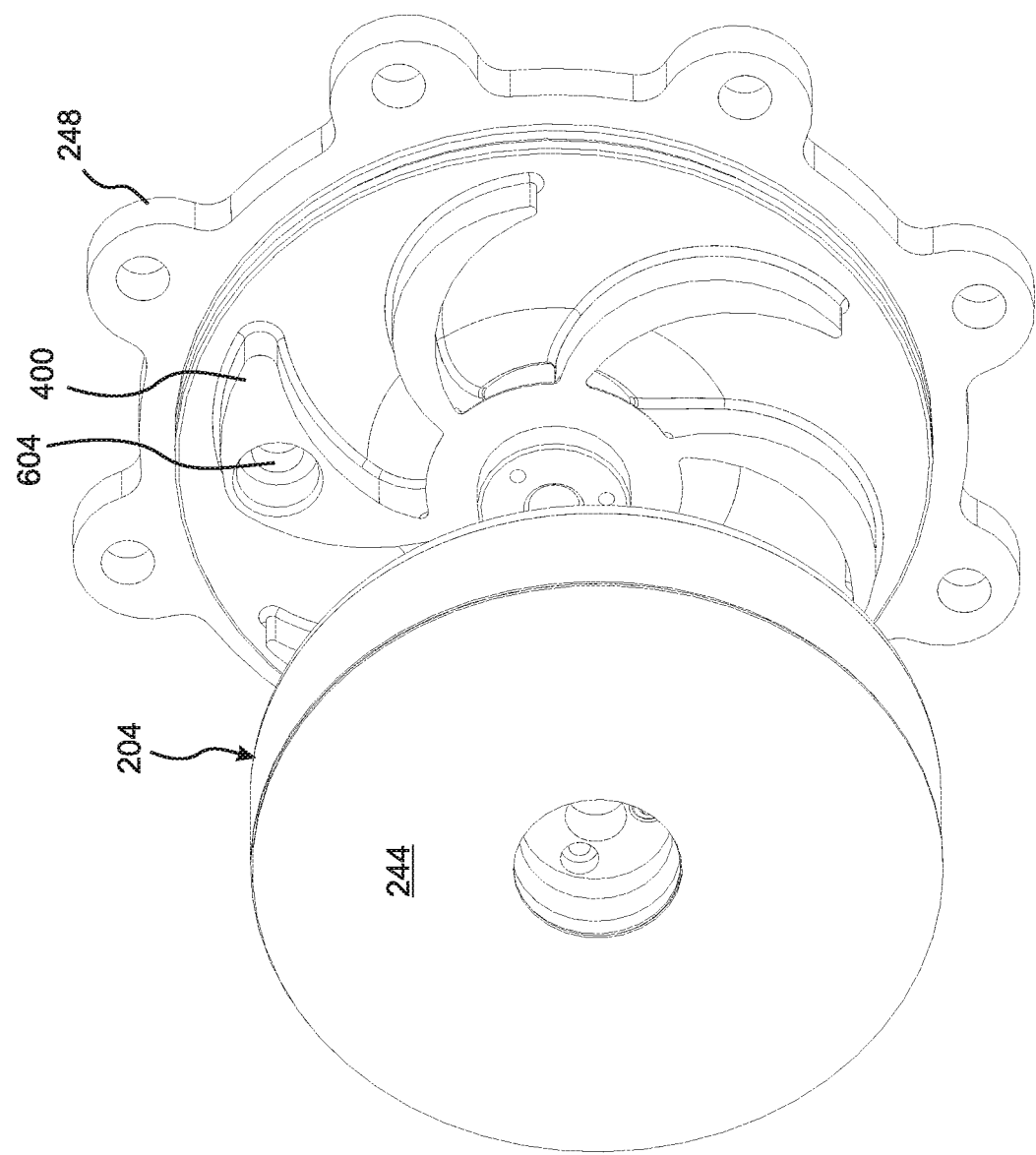
FIG. 6G is an exploded perspective view drawn to scale from the side and front of the stator assembly FIG. 6F shown with the rear plate welded in place.
Figure 6H:
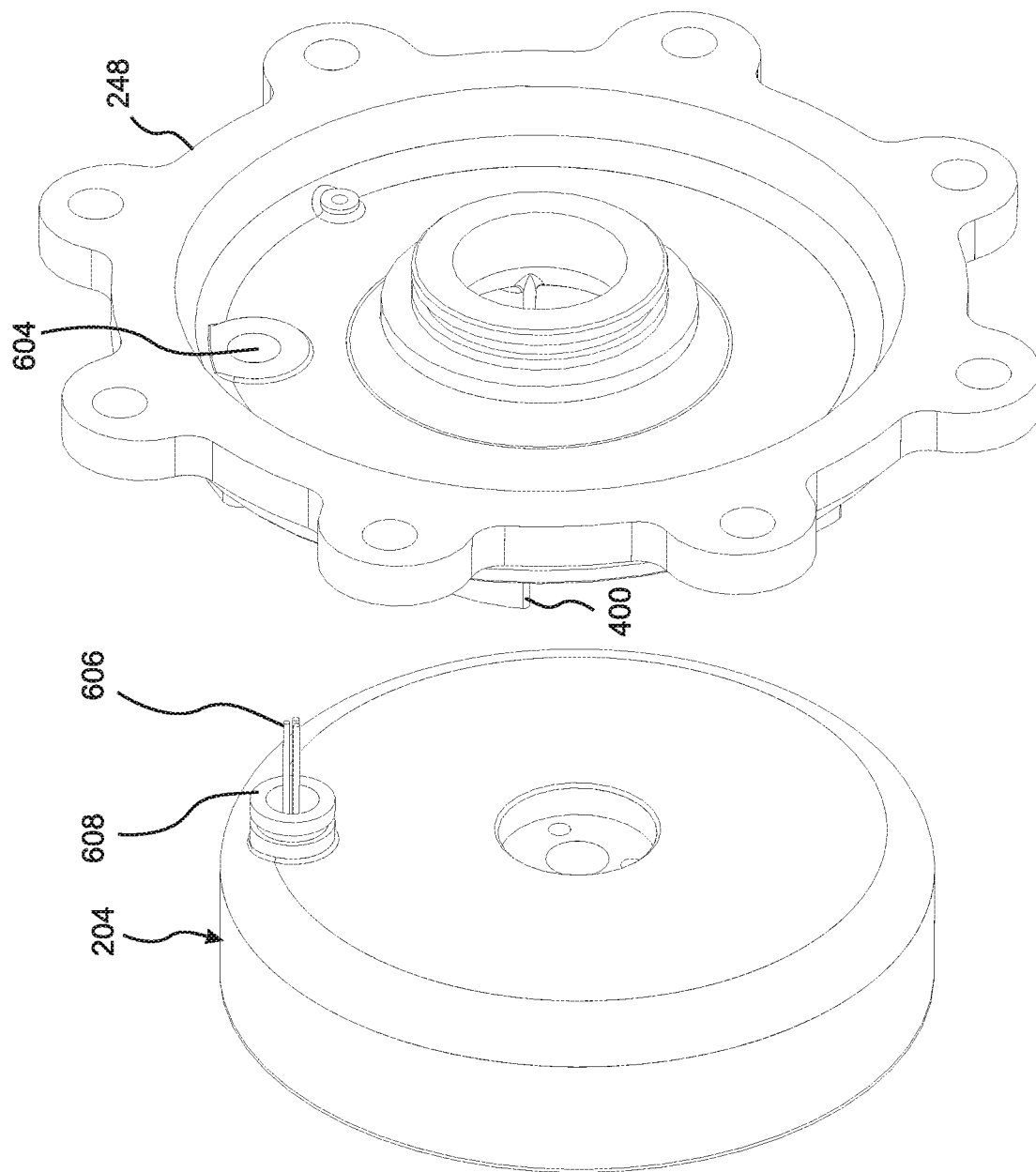
FIG. 6H is an exploded perspective view drawn to scale from the side and rear of the stator assembly with welded rear plate of FIG. 6G.
Figure 6I:
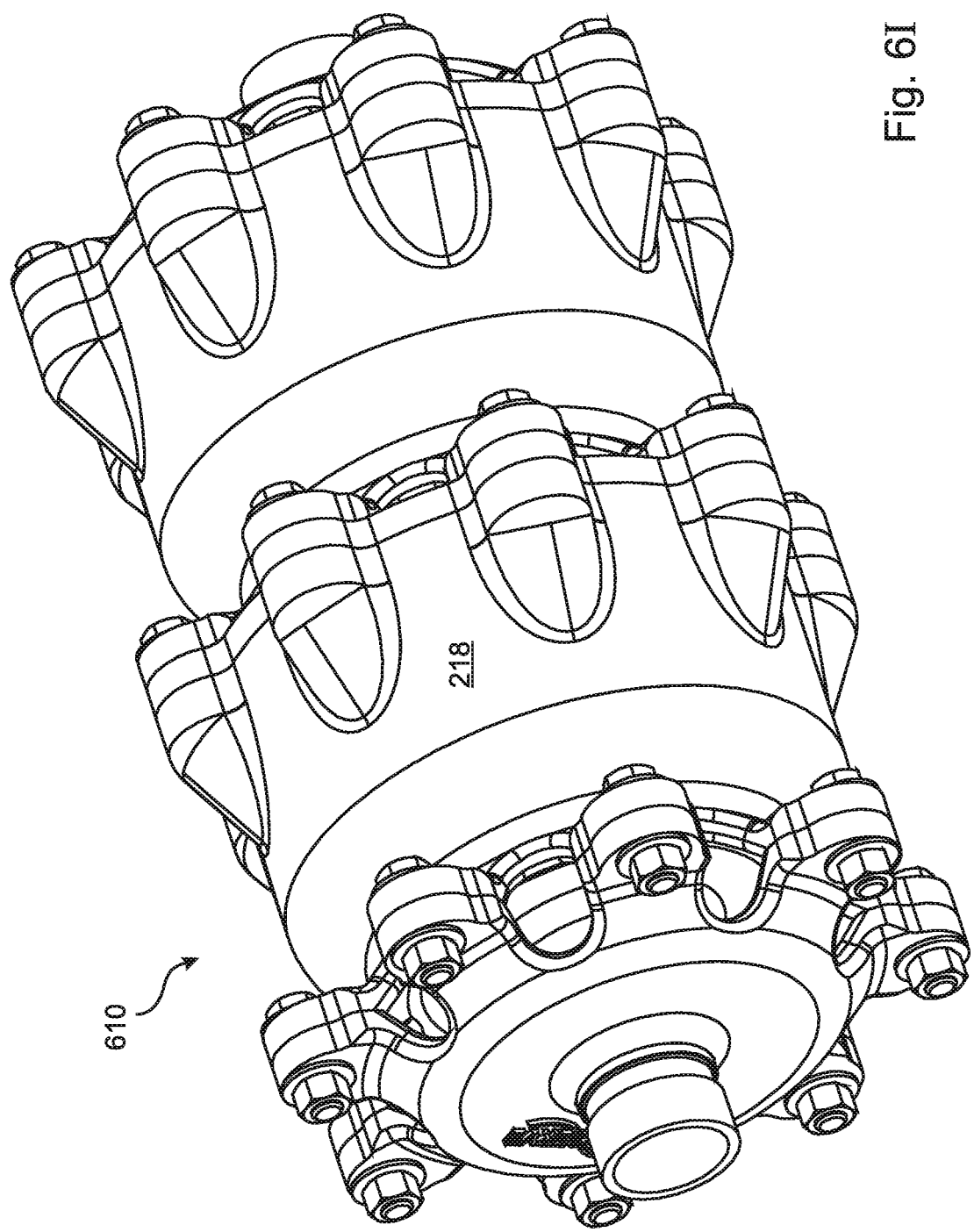
FIG. 6I is a perspective view drawn to scale of the outer housing of the pump of FIGS. 6A through 6H.

FIG. 6B is an enlarged cross sectional view of one of the rotors 206 and magnet structures 600 of FIG. 6A shown as assembled. FIG. 6C is a cross sectional exploded view of the rotor 206 and magnet structure 600 of FIG. 6B. FIGS. 6D and 6E are front and rear exploded perspective views of the rotor 206 and magnet structure 600 of FIG. 6B. FIG. 6F is an enlarged exploded perspective view from the front of one of the stator assemblies of FIG. 6A, shown in relationship to the rear flange 248 of the pump housing. It can be seen that the guide vanes 400 that are located in the exit flow path of the process fluid are fixed to the rear flange 248, wherein the rear plate 244 of the module has been removed to reveal the interior. FIG. 6G is identical to FIG. 6F, except that the rear plate 244 has been welded in place, thereby completing the sealed stator module. FIG. 6H is an enlarged exploded perspective view from the rear of the stator assembly of FIG. 6G. The electrical port 608 that serves as a conduit for the stator coil leads 606 is clearly visible in the figure. FIG. 6I is a perspective view of the fully assembled pump 610 of FIG. 6A.

Figure 7A:
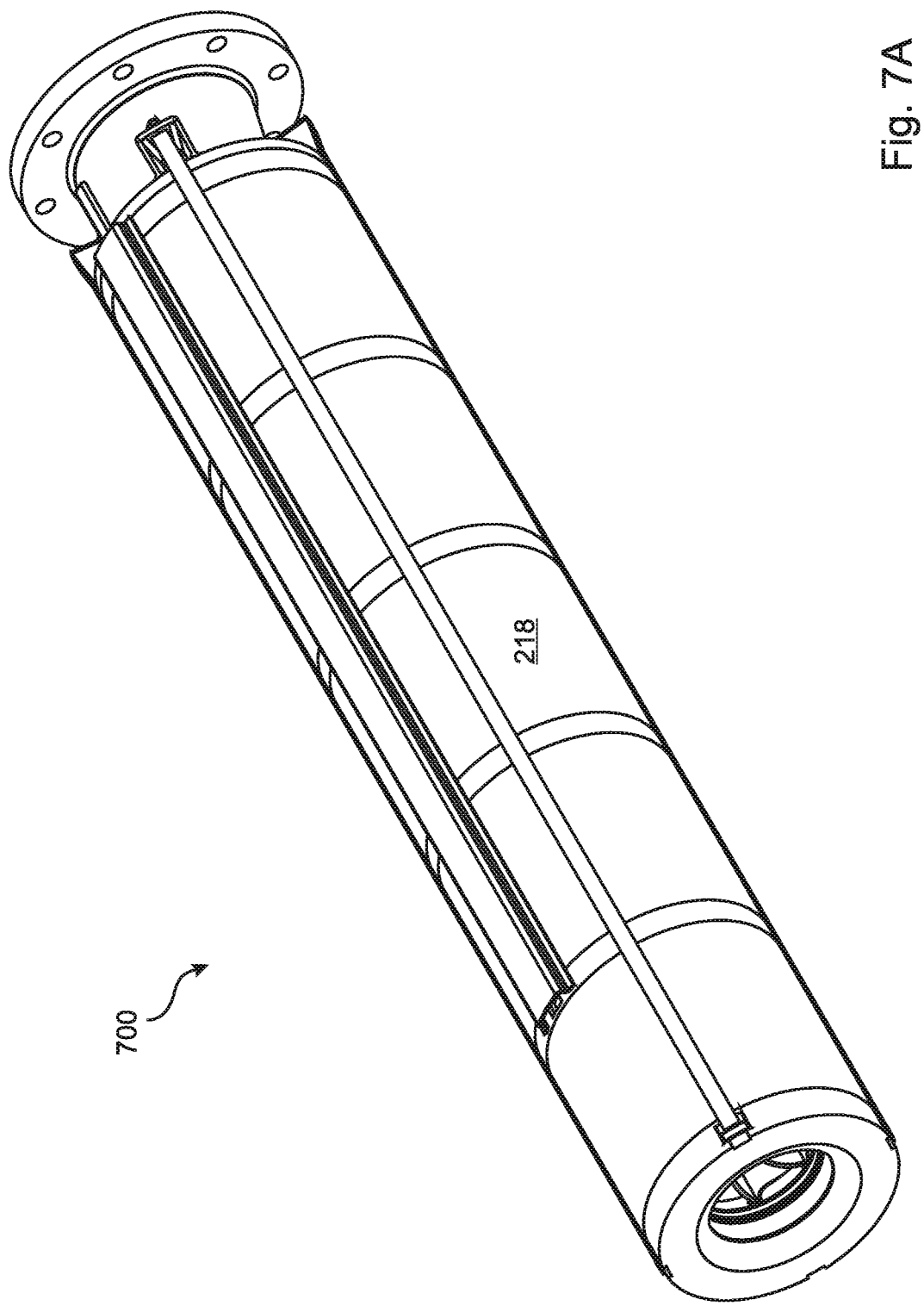
FIG. 7A is a perspective view drawn to scale of a four-module pump of a design that differs from the pump of FIGS. 6A through 6H, but incorporates the same modular stator and magnet structure designs that are included in the pump modules of FIGS. 6A through 6H.
Figure 7B:
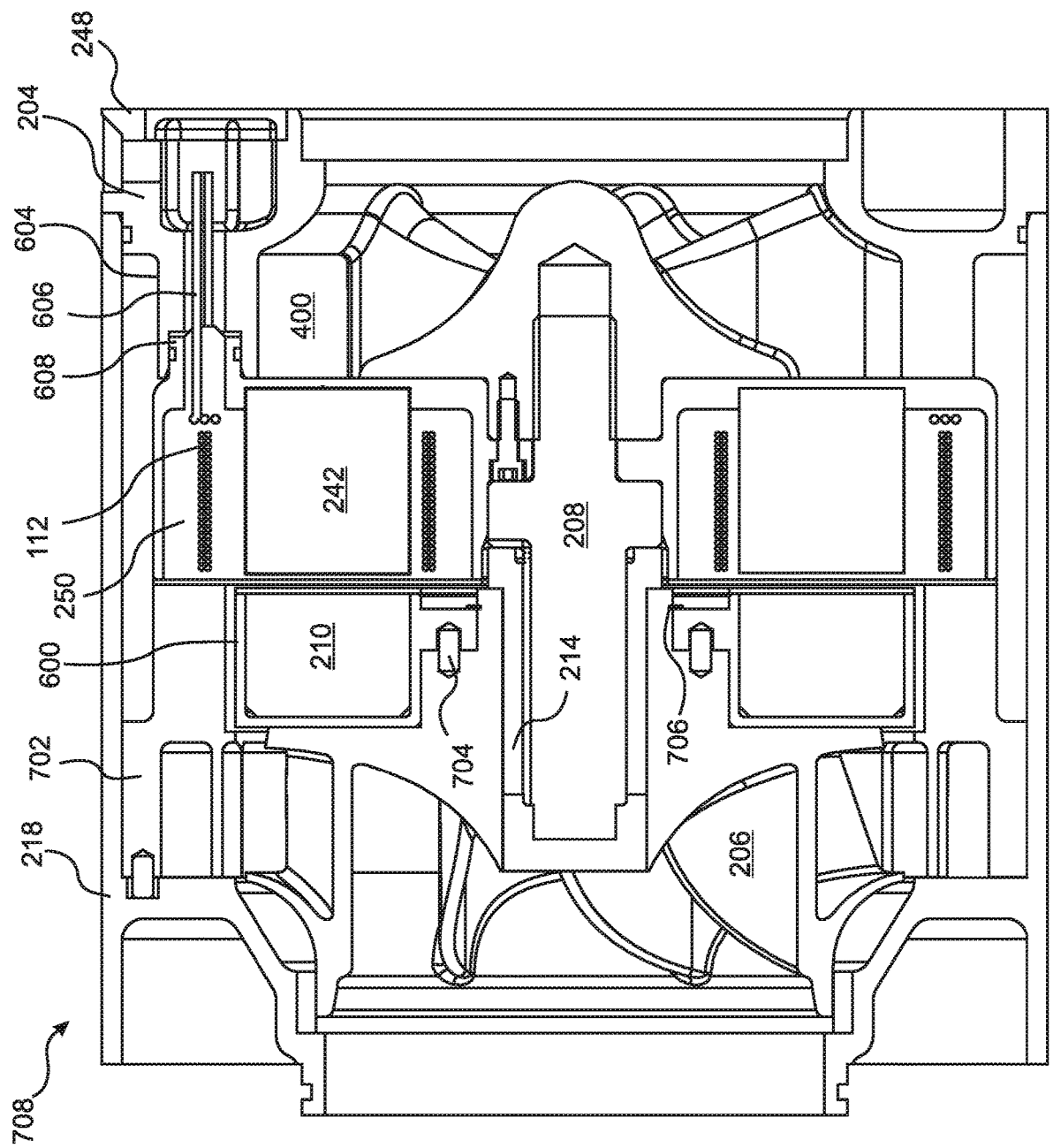
FIG. 7B is a cross sectional view drawn to scale from the side drawn to scale of a single module of the pump of FIG. 7A.

FIG. 7A is a perspective view of a four-module pump design 700 that is considerably different from the pump of FIGS. 6A through 6H. FIG. 7B is a cross sectional illustration of a single module 708 of the pump of FIG. 7A, and FIG. 7C is an exploded cross sectional view of the module 708 of FIG. 7B. It can be seen in the figures that a diffuser 702 is included in the illustrated design, and that the rear flange 248, pump rotor 206, stator housing 204 and pump housing 218 are all quite different from the designs shown in FIGS. 6A through 6H. Nevertheless, the pump 700 of FIGS. 7A through 7C incorporates essentially the same modular motor components as are included in FIGS. 6A through 6H. The only small difference is that, in the illustrated embodiment, a snap ring 704 is used to constrain the magnet structure 600 axially, and pins 706 are used to constrain the magnet structure 600 rotationally. However, it is obvious that bolts could be used to constrain the magnet structure, as in FIGS. 6A through 6H, with only a trivial modification to the design.

In FIGS. 2B, 4, 6A and 6H, only two pump modules 200 are shown, while the pump 700 of FIG. 7 includes five modules. In general, it can be easily seen that in embodiments any number of the disclosed pump or turbine stages 200 can be combined in series without adding additional complexity or complication to the design, operation, and maintenance of the pump or turbine 200. In particular, high stage counts according to the disclosed design do not raise any issues regarding shaft size, shaft deflection, rotor dynamics, bearing loads, motor alignment, or alignment between stages 200.

Certain embodiments include at least some drive electronics that are shared between more than one stage. For example, in some embodiments AC power is converted to DC power by a common set of large electronics, which is then distributed to the individual pump or turbine stages as needed. Other embodiments include a plurality of variable frequency drives ("VFD's") 216, and in some of these embodiments the motor or generator coils 212 in each stage 200 of the pump or turbine are independently controlled by a dedicated VFD 216 or other controller. One of the key benefits in some of these embodiments is that the first stage can run at lower speeds than the rest of the pump, so as to accommodate low net positive suction head ("NPSH") and off-peak conditions. In some applications, varying the speed of only the final stage provides a useful approach for precisely controlling the output pressure and/or flow.

Providing an individual VFD drive 216 for each stage 200 can also serve as a fail-safe redundancy, whereby if one stage fails, the rest will continue to operate and the pump will continue to function. The continued function after failure of a pump stage may be with reduced head and flow, or the speed of the remaining stages can be increased to compensate for the lost head and flow of the failed stage. This approach creates a failure scenario wherein the pump continues to operate, possibly at reduced head and flow, until an operator, after becoming aware of the stage failure, has time to safely shut down the system. In contrast, the failure of one stage in a traditional pump or turbine typically results in failure of the entire pump or turbine, with a complete loss of performance and a sudden, uncontrolled shutdown of the system.

In the embodiment of FIG. 2A, the motor is a radial motor that includes permanent magnets mounted about the periphery of the rotor, while the other embodiments that are illustrated in the figures include disk or "pancake" style rotors 206 that incorporate permanent magnets 210 that are positioned behind the rear surfaces of the rotors 206. Induction motors are used in other embodiments. Some embodiments include variable speed drives that enable the synchronous operating speeds of the pump stages 200 to rise above 3600 rpm.

In the embodiments that are illustrated in the drawings, the pump stages 200 are centrifugal designs having radial flow rotors 206. Some of these embodiments include rotors with specific speeds up to about 2,000 US units, and ins some embodiments up to 4000 US units and even 5000 US units. Other embodiments include pump stages 200 with radial flux rotor designs.

In the embodiments that are illustrated in the drawings, combined radial and one-way thrust bearings 214 are used in place of separate axial and radial bearings. The illustrated embodiments include stationary shafts 208 inserted through the hubs of the rotors 206 and threaded into the pump stage housing 218, which facilitate easy assembly and maintenance without special tools. Using a sensor-less motor along with appropriate VFD drives 216 also reduces any requirement for instrumentation on each stage 200 in the illustrated embodiments.

Certain embodiments of the present invention include modular stages 200 having an inverted rotor/stator configuration, whereby the rotor and the stator can both rotate independently from each other in opposite directions. And some embodiments include stators and/or diffusers that rotate individually, for example with separate motors driving the rotors and diffusers. In some of these embodiments, the diffusers are implemented in a manner similar to the disclosure of U.S. patent application Ser. No. 15/101,460.

As is well known in the art, roto-dynamic pumps and turbines are often highly similar in their physical designs, such that the difference between a pump and a turbine can sometimes be mainly a question of use rather than structure.

Accordingly, while the embodiments that are illustrated in the drawings are pumps, the features of the present invention that are discussed herein with reference to a turbine or to a pump should be understood to refer equally to both, except where the context requires otherwise.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A modular sealless pump or turbine system, comprising:
 a plurality of pump or turbine modules including a first pump or turbine module and a second pump or turbine module, the first and second pump or turbine modules each respectively comprising:
  a module housing surrounding the respective module, the module housing having a first end and an opposite second end, the first end being open and the second end having a socket;
  a rotor suspended on a shaft within the module housing, the rotor disposed proximate the first end, and the rotor having a hollow protrusion;
  a motor within the module housing configured to drive a rotation of the rotor, or a generator within the module housing configured to be driven by rotation of the rotor, the motor or generator comprising:
   a stator within a sealed stator housing, the stator being axially offset from the rotor, the stator comprising at least one electromagnet directed axially and proximally toward the rotor, and
   a plurality of magnetic devices assembled in a magnet structure that is removably constrained to be axially fixed and rotationally cooperative with the rotor, the magnetic devices being configured by the magnet structure to pass in axial proximity to the at least one electromagnet as the rotor rotates;
  a flow path symmetrically distributed about the stator housing between the stator housing and the module housing, the flow path directing a flow of a working fluid between the first and second end,
  wherein the flow of the working fluid that flows through the flow path is required to flow through the hollow protrusion and the socket;
 the second end of the module housing of the first pump or turbine module being configured to form a first direct attachment with the first end of the module housing of the second pump or turbine module to close the open first end of the second pump or turbine module, and the first end of the module housing of the first pump or turbine module being configured to form an alternative second direct attachment with the second end of the module housing of the second pump or turbine module to close the open first end of the first pump or turbine module,
 wherein said first direct attachment includes inserting the hollow protrusion of the first module into the socket of the second module and wherein said second direct attachment includes inserting the hollow protrusion of the second module into the socket of the first module,
 the modular sealless pump or turbine system further comprising:
  an inlet having a second socket, the inlet configured to seal the open first end of either of the first or second pump or turbine modules and configured to allow the hollow protrusion of either of the first or second turbine modules to be inserted into the second socket; and
  an outlet having a second hollow protrusion, the outlet configured to directly attach to the second end of either of the first or second pump or turbine modules wherein the second hollow protrusion configured to be inserted into the socket of either of the first or second pump or turbine modules.

2. The system of claim 1, wherein the flow path is an annular flow path surrounding the stator housing.

3. The system of claim 1, wherein the flow path comprises a plurality of flow passages arranged symmetrically about the stator housing.

4. The system of claim 1, wherein the rotor is suspended by a fixed shaft, and the rotor is configured to rotate about the shaft.

5. The system of claim 4, wherein the rotor is supported on the fixed shaft by a pair of bearings, one of which maintains an axial position of the rotor while the other of which provides radial support of the rotor.

6. The system of claim 4, wherein the rotor is supported axially and radially on the fixed shaft by a combined radial and one-way thrust bearing.

7. The system of claim 4, wherein the rotor is supported on the fixed shaft by at least one bearing that is lubricated by the working fluid.

8. The system of claim 4, wherein the fixed shaft is fixed to the stator housing by threaded attachment.

9. The system of claim 1, wherein the magnetic devices are permanent magnets.

10. The system of claim 1, wherein the magnetic devices are squirrel cage coils.

11. The system of claim 1, wherein the flow path extends over at least 50% of an outer surface of the stator housing, and at least 90% of the working fluid that flows through the first or second pump or turbine module is in direct thermal contact with the stator housing.

12. The system of claim 1, wherein the first or second pump or turbine module is configured such that all of the working fluid that flows through the first or second pump or turbine flows through the flow path.

13. The system of claim 1, further comprising: thermal insulation interposed between the flow path and the stator housing; and a cooling fluid path formed between the thermal insulation and the stator housing, the cooling fluid path being in thermal communication with the stator housing and configured to enable an exchange of heat between the stator housing and a cooling fluid flowing through the cooling fluid path.

14. The system of claim 1, wherein the at least one electromagnet of the stator is directed toward a radial periphery of the rotor, and the magnetic devices are fixed near the radial periphery of the rotor.

15. The system of claim 1, wherein the at least one electromagnet of the stator is directed toward a side of the rotor, and the magnetic devices are fixed to the side of the rotor or to a disk that is coaxial with and proximal to the side of the rotor.

16. The system of claim 1, wherein the magnet structure of at least one of the first and second pump or turbine modules is sealed, thereby excluding the working fluid from reaching the magnetic devices.

17. The system of claim 1, wherein the motors or generators of the first and second pump or turbine modules can be independently controlled so as to cause the corresponding rotors to rotate at different rates.

18. The system of claim 17, wherein the two, independently controlled motors or generators are controlled by separate variable frequency drives.

19. The system of claim 1, wherein the first and second pump or turbine modules are configured such that the modular sealless pump or turbine system as a whole is able to continue functioning as a pump or as a turbine despite failure of at least one of the first or second pump or turbine modules included in the modular sealless pump or turbine system.

20. The a system of claim 1, further comprising control electronics that provide shared support to at least the first and second pump or turbine modules.

21. The system of claim 1, further comprising at least a third pump or turbine module.

22. The system of claim 1, wherein the magnet structure in each of the first and second pump or turbine modules is sealed, thereby excluding the working fluid from reaching the magnetic devices.

* * * * *